United States Patent
Feng et al.

(10) Patent No.: US 12,451,971 B2
(45) Date of Patent: Oct. 21, 2025

(54) INTEGRATED LITHIUM NIOBATE MICROWAVE PHOTONIC PROCESSING ENGINE

(71) Applicant: City University of Hong Kong, Hong Kong (CN)

(72) Inventors: Hanke Feng, Hong Kong (CN); Cheng Wang, Hong Kong (CN); Tong Ge, Hong Kong (CN); Xiaoqing Guo, Hong Kong (CN); Yixuan Yuan, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 300 days.

(21) Appl. No.: 18/364,534

(22) Filed: Aug. 3, 2023

(65) Prior Publication Data
US 2024/0348341 A1    Oct. 17, 2024

Related U.S. Application Data

(60) Provisional application No. 63/495,566, filed on Apr. 12, 2023.

(51) Int. Cl.
*H04B 10/04*      (2006.01)
*G02F 1/21*      (2006.01)
(Continued)

(52) U.S. Cl.
CPC ............ *H04B 10/54* (2013.01); *G02F 1/212* (2021.01); *G02F 1/2255* (2013.01); *H04B 2210/006* (2013.01)

(58) Field of Classification Search
CPC .. H04B 10/516; H04B 10/548; H04B 10/541; H04B 10/5561; H04B 10/54;
(Continued)

(56) References Cited

U.S. PATENT DOCUMENTS

| | | | | |
|---|---|---|---|---|
| 7,389,053 | B1 * | 6/2008 | Ilchenko | G02B 6/12007 398/187 |
| 7,587,144 | B2 * | 9/2009 | Ilchenko | H04B 10/60 398/115 |
| 8,879,873 | B2 * | 11/2014 | Goh | H04B 10/5053 385/3 |

OTHER PUBLICATIONS

Liu, W. et al. A fully reconfigurable photonic integrated signal processor. Nat. Photon. 10, 190-195 (2016).
(Continued)

*Primary Examiner* — Hanh Phan
(74) *Attorney, Agent, or Firm* — S&F/WEHRW

(57) ABSTRACT

An integrated MWP processing engine based on a thin-film lithium niobate (LN) platform capable of performing computation tasks of analog signals up to 92G samples per second is provided. By integrating a high-speed electro-optic modulation block and a multi-purpose low-loss signal processing section on the same chip fabricated from a 4-inch wafer-scale process, we demonstrate high-speed analog computation, i.e. first- and second-order temporal integration and differentiation with computing accuracies up to 98.1%, and deploy these functions to showcase three proof-of-concept applications, namely, ordinary differential equation solving, ultra-wideband signal generation and high-speed edge detection of images. We further leverage the image edge detector to enable a photonic-assisted image segmentation model that effectively outlines boundaries of melanoma lesion in medical images, achieving orders of magnitude faster processing speed and lower power consumption than conventional electronic processors. Our ultrafast LN MWP engine provides compact, low-power, low-latency and cost-effective solutions.

19 Claims, 27 Drawing Sheets

(51) Int. Cl.
*G02F 1/225* (2006.01)
*H04B 10/54* (2013.01)

(58) Field of Classification Search
CPC .. H04B 10/40; H04B 10/505; H04B 10/5051; H04B 10/5053; H04B 10/2575; G02F 1/212; G02F 1/2255; G02F 1/225; G02F 1/2257; G02F 1/0121
USPC ....... 398/183, 188, 184, 185, 186, 187, 158, 398/159, 135, 136, 115, 182, 45, 48, 49, 398/201, 79, 194; 385/1, 2, 3
See application file for complete search history.

(56) References Cited

OTHER PUBLICATIONS

Tao, Y. et al. Fully On-Chip Microwave Photonic Instantaneous Frequency Measurement System. Laser & Photonics Reviews, 2200158 (2022).
Dong, J. et al. Compact, flexible and versatile photonic differentiator using silicon Mach-Zehnder interferometers. Opt. Express 21, 7014-7024 (2013).
Liu, W., Zhang, W. & Yao, J. Silicon-based integrated tunable fractional order photonic temporal differentiators. J. Lightwave Technol. 35, 2487-2493 (2017).
Slavík, R. et al. Photonic temporal integrator for all-optical computing. Opt. Express 16, 18202-18214 (2008).
Xu, X. et al. Microcomb-based photonic RF signal processing. IEEE Photonics Technology Letters 31, 1854-1857 (2019).
Minasian, R. A., Chan, E. & Yi, X. Microwave photonic signal processing. Opt. Express 21, 22918-22936 (2013).
Ferrera, M. et al. On-chip CMOS-compatible all-optical integrator. Nat. Commun. 1, 1-5 (2010).
Zhang, W., Wang, Y., Xu, D., Luo, H. & Wen, S. All-optical differentiator in frequency domain. Appl. Phys. Lett. 120, 011102 (2022).
Li, M., Jeong, H.-S., Azaña, J. & Ahn, T.-J. 25-terahertz-bandwidth all-optical temporal differentiator. Opt. Express 20, 28273-28280 (2012).
Morton, P. A. et al. High-power, high-linearity, heterogeneously integrated III-V on Si MZI modulators for RF photonics systems. IEEE Photonics Journal 11, 1-10 (2019).
Tran, M. A. et al. Extending the spectrum of fully integrated photonics to submicrometre wavelengths. Nature 610, 54-60 (2022).
Xiang, C. et al. Laser soliton microcombs heterogeneously integrated on silicon. Science 373, 99-103 (2021).
Boes, A. et al. Lithium niobate photonics: Unlocking the electromagnetic spectrum. Science 379, (2023).
Zhang, M., Wang, C., Kharel, P., Zhu, D. & Lonar, M. Integrated lithium niobate electro-optic modulators: when performance meets scalability. Optica 8, 652-667 (2021).
Zhang, Y. et al. Systematic investigation of millimeter-wave optic modulation performance in thin-film lithium niobate. Photonics Res. 10, 2380-2387 (2022).
Mercante, A. J. et al. Thin film lithium niobate electro-optic modulator with terahertz operating bandwidth. Opt. Express 26, 14810-14816 (2018).
He, M. et al. High-performance hybrid silicon and lithium niobate Mach-Zehnder modulators for 100 Gbit s-1 and beyond. Nat. Photon. 13, 359-364 (2019).
Wang, C. et al. Integrated lithium niobate electro-optic modulators operating at CMOS-compatible voltages. Nature 562, 101-104 (2018).
Ahmed, A. N. R. et al. Subvolt electro-optical modulator on thin-film lithium niobate and silicon nitride hybrid platform. Opt. Lett. 45, 1112-1115 (2020).
Feng, H. et al. Ultra-high-linearity integrated lithium niobate electro-optic modulators. Photonics Res. 10, 2366-2373, (2022).
Zhang, M., Wang, C., Cheng, R., Shams-Ansari, A. & Lončar, M. Monolithic ultra-high-Q lithium niobate microring resonator. Optica 4, 1536-1537 (2017).
Escalé, M. R., Pohl, D., Sergeyev, A. & Grange, R. Extreme electro-optic tuning of Bragg mirrors integrated in lithium niobate nanowaveguides. Optics letters 43, 1515-1518 (2018).
Hu, Y. et al. On-chip electro-optic frequency shifters and beam splitters. Nature 599, 587-593 (2021).
Zhou, J.-x. et al. Electro-optically switchable optical true delay lines of meter-scale lengths fabricated on lithium niobate on insulator using photolithography assisted chemo-mechanical etching. Chinese Physics Letters 37, 084201 (2020).
Luke, K. et al. Wafer-scale low-loss lithium niobate photonic integrated circuits. Opt. Express 28, 24452-24458 (2020).
Li, Z. et al. Tightly confining lithium niobate photonic integrated circuits and lasers. arXiv preprint arXiv:2208.05556 (2022).
Hill, M. T. et al. A fast low-power optical memory based on coupled micro-ring lasers. nature 432, 206-209 (2004).
Tan, S. et al. High-order all-optical differential equation solver based on microring resonators. Opt. Lett. 38, 3735-3738 (2013).
Yang, T. et al. All-optical differential equation solver with constant-coefficient tunable based on a single microring resonator. Scientific reports 4, 1-6 (2014).
Perez, D. et al. Silicon photonics rectangular universal interferometer. Laser & Photonics Reviews 11, 1700219 (2017).
Wen, H. et al. Few-mode fibre-optic microwave photonic links. Light: Science & Applications 6, e17021-e17021 (2017).
Zhang, M. et al. Broadband electro-optic frequency comb generation in a lithium niobate microring resonator. Nature 568, 373-377 (2019).
Kharel, P., Reimer, C., Luke, K., He, L. & Zhang, M. Breaking voltage-bandwidth limits in integrated lithium niobate modulators using micro-structured electrodes. Optica 8, 357-363 (2021).
Milletari, F., Navab, N. & Ahmadi, S.-A. V-net: Fully convolutional neural networks for volumetric medical image segmentation. 2016 fourth international conference on 3D vision (3DV), 565-571 (2016).
Wang, B., de Lima, T. F., Shastri, B. J., Prucnal, P. R. & Huang, C. Multi-Wavelength Photonic Neuromorphic Computing for Intra and Inter-Channel Distortion Compensations in WDM Optical Communication Systems. IEEE J. Sel. Top. Quant. Electron. 29, 1-12 (2022).
Huang, C. et al. A silicon photonic-electronic neural network for fibre nonlinearity compensation. Nat. Electron. 4, 837-844 (2021).
Huang, C. et al. High-capacity space-division multiplexing communications with silicon photonic blind source separation. J. Lightwave Technol. 40, 1617-1632 (2022).

* cited by examiner

INTEGRATED LITHIUM NIOBATE MICROWAVE PHOTONIC PROCESSING ENGINE

CROSS-REFERENCE TO RELATED APPLICATIONS

This application claims priority to, and the benefit of, U.S. Provisional Patent Application Ser. No. 63/495,566 filed Apr. 12, 2023, the disclosure of which is incorporated by reference herein in its entirety.

ABBREVIATIONS

AC alternating current
AI artificial intelligence
ASPP atrous spatial pyramid pooling
AWG arbitrary waveform generator
CMOS complementary metal-oxide semiconductor
CW continuous-wave
DC direct current
DCNN deep convolution neutral network
DSP digital signal processor
EDFA erbium-doped fiber amplifier
EO electro-optic
FWHM full width at half maximum
FCC Federal Communications Commission
FPC fiber polarization controller
FSR free spectral range
GPS Global Positioning System
GSa/s ×$10^9$ samples per second
InP indium phosphide
LN lithium niobate
LNPIC lithium niobate photonic integrated circuit
MAE mean absolute error
MMI multi-mode interference
MWP microwave photonics
MZI Mach-Zehnder interferometer
ODE ordinary differential equation
PD photodetector
PIC photonic integrated circuit
RF radio frequency
SiN silicon nitride
TO thermo-optic
UV ultraviolet
UWB ultra-wide bandwidth
VNA vector network analyzer

TECHNICAL FIELD

The present disclosure generally relates to a MWP system for performing analog signal processing. In particular, the present disclosure relates to using a LNPIC in the MWP system for processing analog electronic signals with ultra-high-speed, chip-scale integration, high fidelity and low power.

BACKGROUND

The rapid expansion of wireless networks and Internet of Things is posing pressing challenges on the electronic bandwidth, power consumption, and performance of underlying RF systems. The ever-growing AI technologies also demand ultrahigh-speed, low-power, and low-latency processing and computation of analog signals much beyond those offered by traditional electronic integrated circuits. MWP provides effective solutions to address these challenges through the usage of optical devices to perform microwave signal generation, transmission and manipulation tasks. Recently, the surge of photonic integration technologies has further led to a dramatic reduction in the size, weight, and power of MWP systems with enhanced robustness and functionalities, termed integrated MWP. Impressive demonstrations of integrated MWP applications include arbitrary RF waveform generation, true-time delay beamforming, instantaneous frequency measurement [2] and so on.

Despite the tremendous progress, integrated MWP systems still face substantial challenges in performing ultra-high-speed analog signal processing tasks with chip-scale integration, high fidelity, and low power at the same time. An ideal photonic platform to meet these demands should support EO modulators with low drive voltages, broad bandwidths and high linearity to faithfully convert microwave signals into optical signals, as well as a versatile low-loss functional device toolbox for further processing the converted signals in the optical domain. To date, most MWP applications have been demonstrated in silicon photonics [2] owing to its low-cost, large-scale fabrication readiness and the wide availability of functional devices. However, the free carrier injection-based modulation mechanism in silicon is intrinsically accompanied with nonlinear EO response, large carrier-absorption loss, limited response speed, and low power-handling ability, resulting in critical trade-offs between the signal fidelity, power consumption and operation bandwidth achievable in silicon MWP systems. InP is another attractive platform for MWP systems with potential for monolithic integration of active and passive photonic elements on the same chip [1]. However, the relatively large propagation loss and small index contrast in InP waveguides, together with yield issues, significantly hurdle the performances and functionalities achievable in the signal processing section of future large-scale MWP systems. While SiN is an excellent MWP platform by virtue of its ultra-low propagation loss and high-power handling ability, the lack of second-order nonlinearity prevents the realization of high-speed EO modulators in a monolithic SiN platform.

As a result of these material trade-offs, many integrated MWP systems have been realized by combining silicon or SiN photonic chips with traditional off-the-shelf LN modulators, enabling advanced computation and information processing tasks, such as differentiation, integration and Hilbert transformation [3]-[7], at the expense of increased bulkiness, system complexity and power consumption. Such signal processing and computation have also been demonstrated in all-optical circuits [1], [8]-[10], offering potential processing bandwidths up to several THz [10]. However, the processed signals in these demonstrations are usually limited to simple Gaussian or Gaussian-derived waveforms generated by contemporary all-optical techniques, e.g., mode-locked lasers, while signals urgently in need of high-speed processing capability today are often much more complicated and arbitrary and can only be accessed from the electronic domain. Another potential solution is heterogeneous technology [2], [11]-[13] that integrates III-V lasers/photodetector and silicon modulators with low-loss SiN passive photonics via hetero-epitaxial growth or wafer bonding, while with additional cost and complexity in fabrication.

The recently emerged thin-film LN platform is a promising candidate to address these urgent demands and critical challenges by integrating efficient EO convertors and low-loss signal processors on the same chip [14]. The Pockels effect in LN is intrinsically linear, instantaneous and low-loss, ideally suited for realizing high-fidelity microwave-optic signal conversion with low power consumption and broad bandwidths [15]. Recently, many miniaturized and high-performance LN modulators have been demonstrated, exhibiting bandwidths covering the entire microwave and millimeter-wave bands [16]-[18], CMOS-compatible drive voltages [19], [20], and ultra-high linearity performance [21]. Moreover, a full range of high-performance and low-loss functional devices are now endowed on the same platform, including ultrahigh-Q microresonators [22], programmable filters [23], efficient frequency converters/shifters [7] as well as low-loss delay lines [8]. Efforts to scale up these elements into LNPIC with low propagation loss and wafer-scale manufacturability has recently further boosted the cost effectiveness and commercial relevance towards a potentially high-performance, large-scale, and multi-purpose LN MWP system [9], [10].

Despite the aforementioned efforts in developing optical components formed based on the LN material, it is still required to select and organize appropriate optical components to form optical circuits such that the optical circuits as designed perform desired analog signal computation functions. There is a need in the art for designing optical circuits based on the LN platform for analog signal computation. Particularly, the optical circuits are targeted to be formed as LN MWP integrated circuits each comprising a high-speed EO modulation block and a multi-purpose low-loss signal processing section on the same chip, for advantages of ultrahigh-speed execution in analog signal processing, chip-scale integration, high fidelity, and low power at the same time.

SUMMARY

In a first aspect of the present disclosure, a first MWP system for performing analog signal processing is disclosed.

The first MWP system comprises a LNPIC. The LNPIC comprises a processing unit formed in the LNPIC and used for processing an analog electronic signal to yield an output optical signal. The processing unit comprises a MZI amplitude modulator and a set of one or more microring resonators. The MZI amplitude modulator is used for modulating an optical field of an optical carrier signal with the analog electronic signal to yield a modulated optical signal. Respective one or more microring resonators in the set are aligned in resonance peak and connected in series to form an optical circuit used for processing the modulated optical signal to yield an output optical signal.

In certain embodiments, an individual microring resonator has a high Q factor. It thereby causes an intensity of the output optical signal over time to be proportional to an integration result obtained by performing an nth-order integration of the analog electronic signal over time, n being a number of microring resonators in the set. In certain embodiments, n is one, thereby configuring the processing unit to function as a first-order temporal integrator. In certain embodiments, n is two, thereby configuring the processing unit to function as a second-order temporal integrator.

In certain embodiments, the set consists of a single microring resonator. In addition, the single microring resonator is formed with a tunable coupler for tuning a Q factor of the single microring resonator. It allows the Q factor to be selected to cause an intensity of the output optical signal over time to be proportional to a solution of a first-order ODE, thereby configuring the processing unit to function as a first-order ODE solver. The tunable coupler may be an EO tunable coupler or a TO tunable coupler.

The first MWP system may further comprise a PD for receiving the output optical signal from the processing unit and converting the received output optical signal to an output electronic signal to thereby extract the intensity of the output optical signal.

In the first MWP system, a CW laser source may be used for generating the optical carrier signal. An EDFA may be employed to amplify the optical carrier signal prior to feeding the optical carrier signal to the processing unit. A FPC connected to the CW laser source and the EDFA may be used for receiving the optical carrier signal from the CW laser source, controlling a polarization of the received optical carrier signal and forwarding the optical carrier signal with the controlled polarization to the EDFA.

In the first MWP system, an AWG may be used for generating the analog electronic signal.

In a second aspect of the present disclosure, a second MWP system for performing analog signal processing is disclosed.

The second MWP system comprises a LNPIC. The LNPIC comprises a processing unit formed in the LNPIC and used for processing an analog electronic signal to yield an output optical signal. The processing unit comprises an EO phase modulator and a set of one or more unbalanced MZIs. The EO phase modulator is used for modulating a phase of an optical carrier signal with the analog electronic signal to yield a modulated optical signal. Respective one or more unbalanced MZIs in the set are connected in series to form an optical circuit used for processing the modulated optical signal to yield an output optical signal. An individual unbalanced MZI is biased at a predetermined point to cause an optical field or intensity of the output optical signal over time to be proportional to a differentiation result obtained by performing an nth-order differentiation of the analog electronic signal over time, n being a number of unbalanced MZIs in the set.

The predetermined point for biasing may be a null point so as to cause the optical field of the output optical signal over time to be proportional to the obtained differentiation result. Alternatively, the predetermined point may be a quadrature point so as to cause the intensity of the output optical signal over time to be proportional to the obtained differentiation result.

In certain embodiments, n is one, thereby configuring the processing unit to function as a first-order temporal differentiator.

In certain embodiments, n is two, thereby configuring the processing unit to function as a second-order temporal differentiator.

The second MWP system may further comprise a PD for receiving the output optical signal from the processing unit and converting the received output optical signal to an output electronic signal to thereby extract the intensity of the output optical signal.

In the second MWP system, a CW laser source may be used for generating the optical carrier signal. An EDFA may be employed to amplify the optical carrier signal prior to feeding the optical carrier signal to the processing unit. A FPC connected to the CW laser source and the EDFA may be used for receiving the optical carrier signal from the CW laser source, controlling a polarization of the received optical carrier signal and forwarding the optical carrier signal with the controlled polarization to the EDFA.

In the second MWP system, an AWG may be used for generating the analog electronic signal.

In a third aspect of the present disclosure, a third MWP system for performing analog signal processing is disclosed.

The third MWP system comprises a LNPIC. The LNPIC comprises a processing unit formed in the LNPIC and used for processing an analog electronic signal to yield an output optical signal. The processing unit comprises a MZI amplitude modulator and an optical circuit. The MZI amplitude modulator is used for modulating an optical field of an optical carrier signal with the analog electronic signal to yield a modulated optical signal. The optical circuit is used for processing the modulated optical signal to yield an output optical signal. The optical circuit is formed by serially cascading a tunable coupler and a set of one or more unbalanced MZIs connected in series. The tunable coupler is configured to split the modulated optical signal into a pair of split optical signals with a controllable power-splitting ratio and to feed the pair of split optical signals to the set of one or more unbalanced MZIs. An individual unbalanced MZI is biased at a predetermined point. In particular, the controllable power-splitting ratio and predetermined point are selected to cause an optical field or intensity of the output optical signal over time to be proportional to a differentiation result obtained by performing a fractional-order differentiation of the analog electronic signal over time.

In certain embodiments, the tunable coupler is an EO switch or a TO switch. The EO switch may be realized by a first MZI, or a first microring resonator, integrated with EO control electrodes. The TO switch may be realized by a second MZI, or a second microring resonator, integrated with TO control electrodes.

The third MWP system may further comprise a PD for receiving the output optical signal from the processing unit and converting the received output optical signal to an output electronic signal to thereby extract the intensity of the output optical signal.

In the third MWP system, a CW laser source may be used for generating the optical carrier signal. An EDFA may be employed to amplify the optical carrier signal prior to feeding the optical carrier signal to the processing unit. A FPC connected to the CW laser source and the EDFA may be used for receiving the optical carrier signal from the CW laser source, controlling a polarization of the received optical carrier signal and forwarding the optical carrier signal with the controlled polarization to the EDFA.

In the third MWP system, an AWG may be used for generating the analog electronic signal.

In a fourth aspect of the present disclosure, a fourth MWP system for performing analog signal processing is disclosed.

The fourth MWP system comprises a LNPIC. The LNPIC comprises a processing unit formed in the LNPIC and used for processing an analog electronic signal to yield at least one output optical signal. The processing unit comprises a modulator, a first optical switching network and a plurality of optical circuits. The modulator is used for modulating an optical carrier signal with the analog electronic signal to yield a modulated optical signal. An individual optical circuit is arranged to receive the modulated optical signal and configured to perform an optical processing function on the modulated optical signal to generate an optical output. The first optical switching network is used for controllably routing the modulated optical signal to one or more optical circuits selected from the plurality of optical circuits to thereby controllably configure the processing unit to perform one or more respective optical processing functions of the selected one or more optical circuits. As a result, one or more respective optical outputs are generated as the at least one output optical signal.

Preferably, the first optical switching network comprises one or more optical switches. An individual optical switch may be an EO switch or a TO switch. The EO switch may be realized by a first MZI, or a first microring resonator, integrated with EO control electrodes. The TO switch may be realized by a second MZI, or a second microring resonator, integrated with TO control electrodes.

In certain embodiments, the processing unit further comprises a second optical switching network for controllably selecting one of respective optical outputs generated by the plurality of optical circuits to form a single output optical signal.

Preferably, the second optical switching network comprises one or more optical switches. An individual optical switch may be an EO switch or a TO switch. The EO switch may be realized by a third MZI, or a third microring resonator, integrated with EO control electrodes. The TO switch may be realized by a fourth MZI, or a fourth microring resonator, integrated with TO control electrodes.

Generally, the modulator is selected from a group consisting of a MZI amplitude modulator and an EO phase modulator. The MZI amplitude modulator is configured to modulate an optical field of the optical carrier signal with the analog electronic signal. The EO phase modulator is configured to modulate a phase of the optical carrier signal with the analog electronic signal.

Typically, the individual optical circuit is selected from a group consisting of: a first optical circuit formed by a first set of one or more microring resonators aligned in resonance peak and connected in series; a second optical circuit formed by a single microring resonator, wherein the single microring resonator is formed with a first tunable coupler for tuning a Q factor of the single microring resonator; a third optical circuit formed by a third set of one or more unbalanced MZIs connected in series; and a fourth optical circuit formed by serially cascading a second tunable coupler and a fourth set of one or more unbalanced MZIs connected in series.

The fourth MWP system may further comprise a PD for receiving the output optical signal from the processing unit and converting the received output optical signal to an output electronic signal to thereby extract the intensity of the output optical signal.

In the fourth MWP system, a CW laser source may be used for generating the optical carrier signal. An EDFA may be employed to amplify the optical carrier signal prior to feeding the optical carrier signal to the processing unit. A FPC connected to the CW laser source and the EDFA may be used for receiving the optical carrier signal from the CW laser source, controlling a polarization of the received optical carrier signal and forwarding the optical carrier signal with the controlled polarization to the EDFA.

In the fourth MWP system, an AWG may be used for generating the analog electronic signal.

Other aspects of the present disclosure are disclosed as illustrated by the embodiments hereinafter.

BRIEF DESCRIPTION OF THE DRAWINGS

FIGS. 2A-2H are concerned with various aspects regarding a high-speed microwave photonic temporal integrator as disclosed herein in the present disclosure, wherein:

FIG. 2A illustrates a working principle of our MWP temporal integrator, where an integration task in the time domain is equivalent to a transfer function of $H(\omega)=1/j(\omega-\omega_0)$ in the frequency domain;

FIG. 2B depicts an experimental setup for the measurement of the MWP integrator;

FIG. 2C depicts measured and ideal transfer functions for the first-order integrator;

FIG. 2D depicts measured and ideal transfer functions for the second-order integrator;

FIG. 2E depicts normalized measured temporal responses of the integrator, together with simulated and ideal responses, for (i) first-order integration of a single Gaussian pulse showing an integration time of 600 ps, (ii) first-order integration of an in-phase doublet pulse featuring a clear double-step profile, (iii) first-order integration of an out-of-phase doublet pulse, showing a rapid return to the baseline when the second pulse comes in, (iv) first-order integration of a triplet pulse, and (v) second-order integration of a single Gaussian pulse;

FIG. 2F illustrates a working principle of the ODE solving system;

FIG. 2G depicts measured transfer functions of the ODE solvers with different Q factors corresponding to three different k coefficients; and FIG. 2H depicts normalized measured and ideal ODE solutions of a 400 ps input super-Gaussian pulse for different k coefficients.

FIGS. 3A-3H are concerned with various aspects regarding a high-speed microwave photonic temporal differentiator as disclosed herein in the present disclosure, wherein:

FIG. 3A illustrates a working principle of the frequency-chirp-based MWP temporal differentiator, where: an input RF signal x (t) is first loaded on an optical carrier by a phase modulator to induce an instantaneous frequency chirp that follows the differentiation of the input signal; and the chirped frequency information is then projected into optical field or intensity through an unbalanced MZI biased at the null or the quadrature point, respectively;

FIG. 3B depicts an experimental setup for the measurement of MWP differentiator;

FIG. 3C depicts measured and ideal transfer functions for the first- and second-order differentiators;

FIG. 3D depicts measured field-to-field differentiation response for a sequence of input RF signals, where blow-up panels show the measured and ideal results for (i) a Gaussian pulse and (ii) a stepped pulse;

FIG. 3E depicts second-order field-to-field differentiation results for a Gaussian input pulse as shown in the inset;

FIG. 3F provides an illustration of the power spectrum density and frequency range of UWB signal compared with GPS and Bluetooth;

FIG. 3G depicts measured and ideal UWB monocycle pulse generated by field-to-intensity differentiation of a Gaussian pulse (inset); and FIG. 3H depicts a measured RF spectrum of the generated UWB signal from 0 to 15 GHz, and as a reference, the power spectrum mask regulated by FCC.

FIGS. 4A-4D are concerned with high-speed photonic-assisted medical image segmentation, wherein:

FIG. 4A illustrates photonic-assisted image edge detection of a 250×250-pixel 'CityU' logo;

FIG. 4B depicts a flow diagram of the photonic-assisted image segmentation model, where the edge features of melanoma legion images are extracted by our LN-based image-edge detector and passed through a DCNN-based segmentation model to obtain the lesion segmentation results;

FIG. 4C depicts a schematic diagram of the image segmentation model; and

FIG. 4D provides, for illustrative purposes, examples of melanoma lesion segmentation results showing original dermoscope images, simulated and experimentally extracted edge features, as well as the lesion regions segmented by our model, respectively.

Skilled artisans will appreciate that elements in the figures are illustrated for simplicity and clarity and have not necessarily been depicted to scale.

DETAILED DESCRIPTION

Disclosed herein is a MWP system for performing analog signal processing. As mentioned above, it is desirable to have a high-performance, large-scale, and multi-purpose LN MWP system. The MWP system as disclosed herein is exemplarily illustrated by describing in Sections A and B as follows a practical realization of a high-fidelity, broadband and low-power-consumption MWP system leveraging a 4-inch wafer-scale LN platform. Experimental results obtained for the lastly-mentioned MWP system are given in Section C. Section D details embodiments of the disclosed MWP system as developed based on the aforementioned practically-implemented MWP system.

A. Multi-Purpose MWP System as Practically Implemented

The system as practically implemented achieves high-speed analog computation of electronic signals up to 92 GSa/s with multi-purpose functionalities, i.e. first- and second-order temporal integration and differentiation. Building upon these computation functions, we show three proof-of-concept applications, including ODE solving, UWB signal generation, and high-speed edge-feature detection of images. Furthermore, we plug the photonics-assisted image-edge detector, with orders of magnitude higher computing speed and lower power consumption than traditional electronics-based image-edge detection algorithms, into a neural network-based image segmentation model and showcase the effective identification of melanoma lesion outlines in medical diagnostic images.

Figure 1:
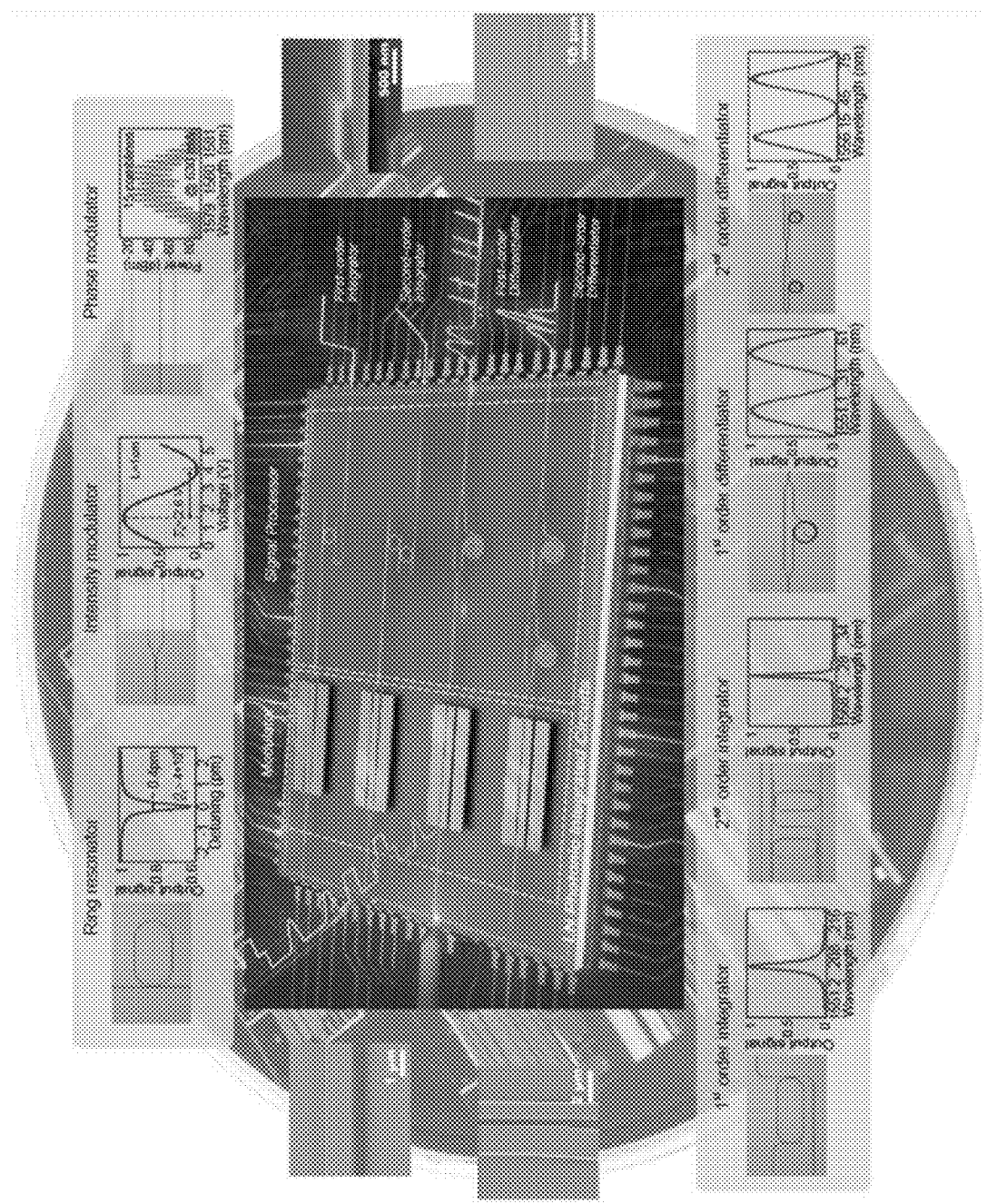
FIG. 1 depicts a wafer-scale LN-based MWP signal processing engine and building blocks as disclosed herein in the present disclosure. The MWP processing engine, as schematically illustrated in the middle panel, has a high-speed EO modulation section that faithfully converts analog electronic signals into optical domain, and a low-loss multi-purpose photonic processing section. Top and bottom rows show the microscope images and key performance metrics of the fundamental building blocks of our high-speed MWP systems, including micro-resonators with intrinsic quality factors $>4\times10^6$, low-voltage intensity and phase modulators for signal encoding, add-drop ring resonators as integrators, unbalanced MZIs as differentiators, as well as cascaded rings and MZIs as second-order integrators and differentiators. The LN MWP integrated circuits are fabricated on a 4-inch wafer scale using a UV stepper lithography system. Background of FIG. 1 shows a photograph of the processed wafer, whereas the left and right insets are detailed scanning electron micrographs of the devices, showing the sidewall of a waveguide, the coupling region of a micro-resonator, the cross-section view of a waveguide and a multi-mode interference coupler, respectively.

FIG. 1 depicts a schematic, conceptual illustration of our multi-purpose MWP system on LN platform. The multi-purpose MWP system has an efficient EO modulation section for transferring high-speed microwave signals into optical domain, and a low-loss multi-purpose photonic signal processing section for realizing the analog computation functions, including first- and second-order temporal integration and differentiation. PICs each realizing the EO modulation section and signal processing section are directly patterned on a 4-inch thin-film LN wafer using an UV stepper lithography system (see Section B.1). Our LN MWP platform supports a variety of high-performance device building blocks, including microring resonators with high intrinsic quality (Q) factors >4 million (corresponding to a propagation loss of <0.1 dB/cm), broadband low-voltage intensity/phase modulators, add-drop microring resonators as temporal integrators, unbalanced MZIs as differentiators, as well as respective cascaded versions for second-order integration and differentiation tasks. The corresponding microscope images of these photonic building blocks and their measured critical performance metrics are shown in the top and bottom insets of FIG. 1. Side insets of FIG. 1 show scanning electron microscope images of a waveguide sidewall, a coupling region of microresonator, a cross-section of waveguide, and a multi-mode interference coupler, respectively. More details on the device design and fabrication can be found in Section B.1. Based on these MWP building blocks, we next discuss two ultrahigh-speed microwave signal computation processes, i.e. temporal integration and differentiation, as well as their applications.

A.1. High-Speed Microwave Photonic Temporal Integrator

Figure 2A:
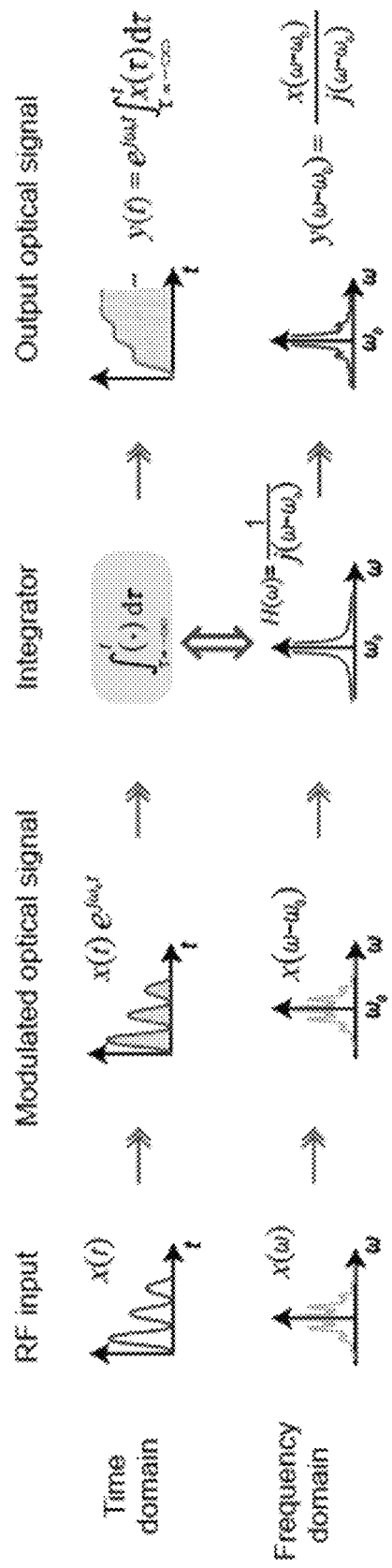
Figure 2B:
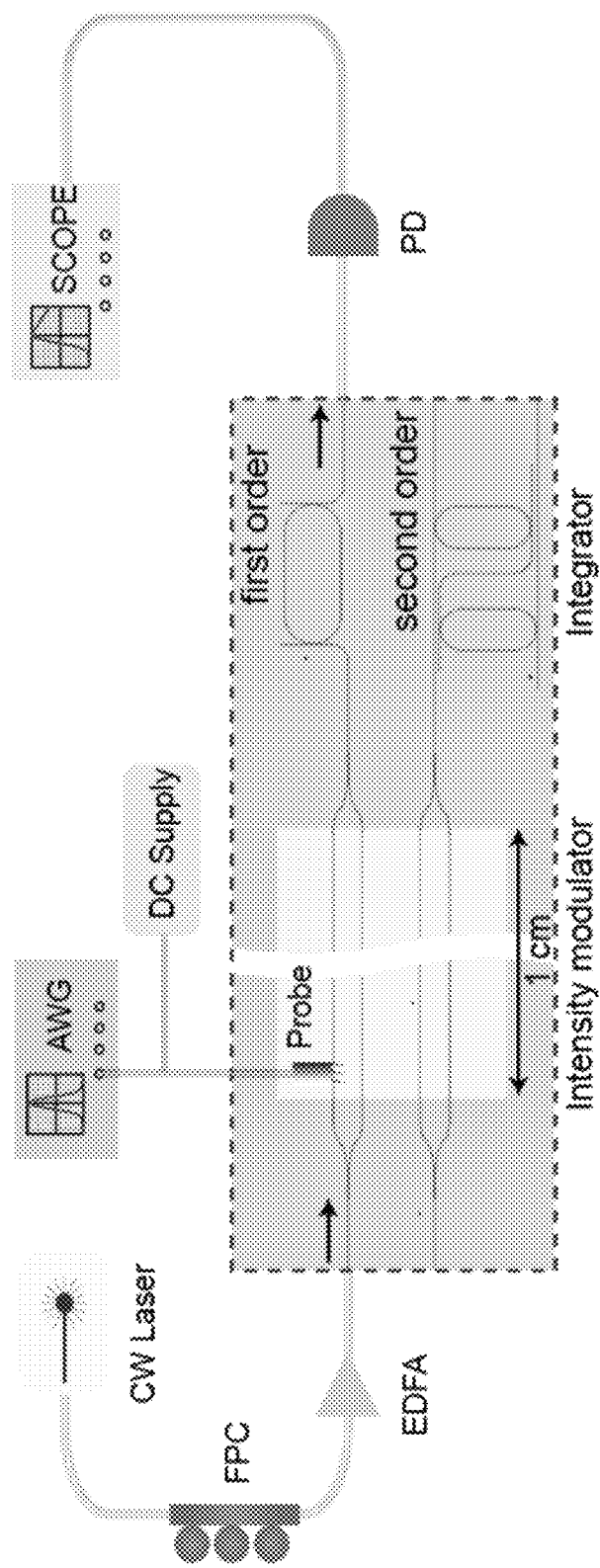
Figures 2C, 2D:
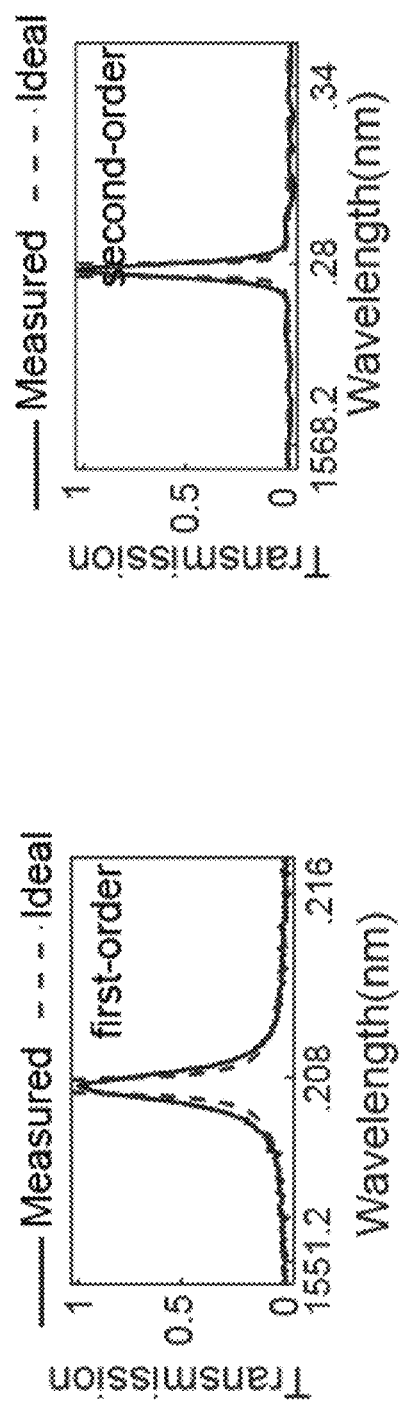

FIG. 2A illustrates the working principle of our high-speed MWP temporal integrator, which has an MZI amplitude modulator and add-drop ring resonators, and is designed to take the temporal integration of a complex input microwave signal and output in the form of optical intensity (see Section B.3). An integration task in the time domain is equivalent to a transfer function of $H(\omega)=1/j(\omega-\omega_0)$ in the frequency domain [8], where: $j=\sqrt{-1}$; $\omega$ is the optical angular frequency; and $\omega_0$ is the carrier frequency of the signal to be processed. Here we adopt add-drop ring resonators to serve as integrators [1], [5], [8], where the Lorentzian lineshape approximately follows the above transfer function within the resonance bandwidth, as shown in FIG. 2C.

This first-order integrator has a measured FSR of 80 GHz, a loaded Q factor of ~0.9 million measured at the drop port, which corresponds to a photon lifetime of 700 ps. We characterize the performance of our LN-based MWP integrator using the experimental setup shown in FIG. 2B. Notably, the measurements are performed using signals directly generated from an AWG without the use of microwave amplifiers (peak voltage=500 mV), enabled by the low-driving voltage and high signal-to-noise ratio of our LN modulators, promising for future low-power-consumption and high-fidelity MWP systems. The integration results in the form of optical intensity are recorded by a high-speed PD through homodyne detection with the optical carrier itself when the modulator is biased at the quadrature point. (see Section B.3).

Figure 2E:
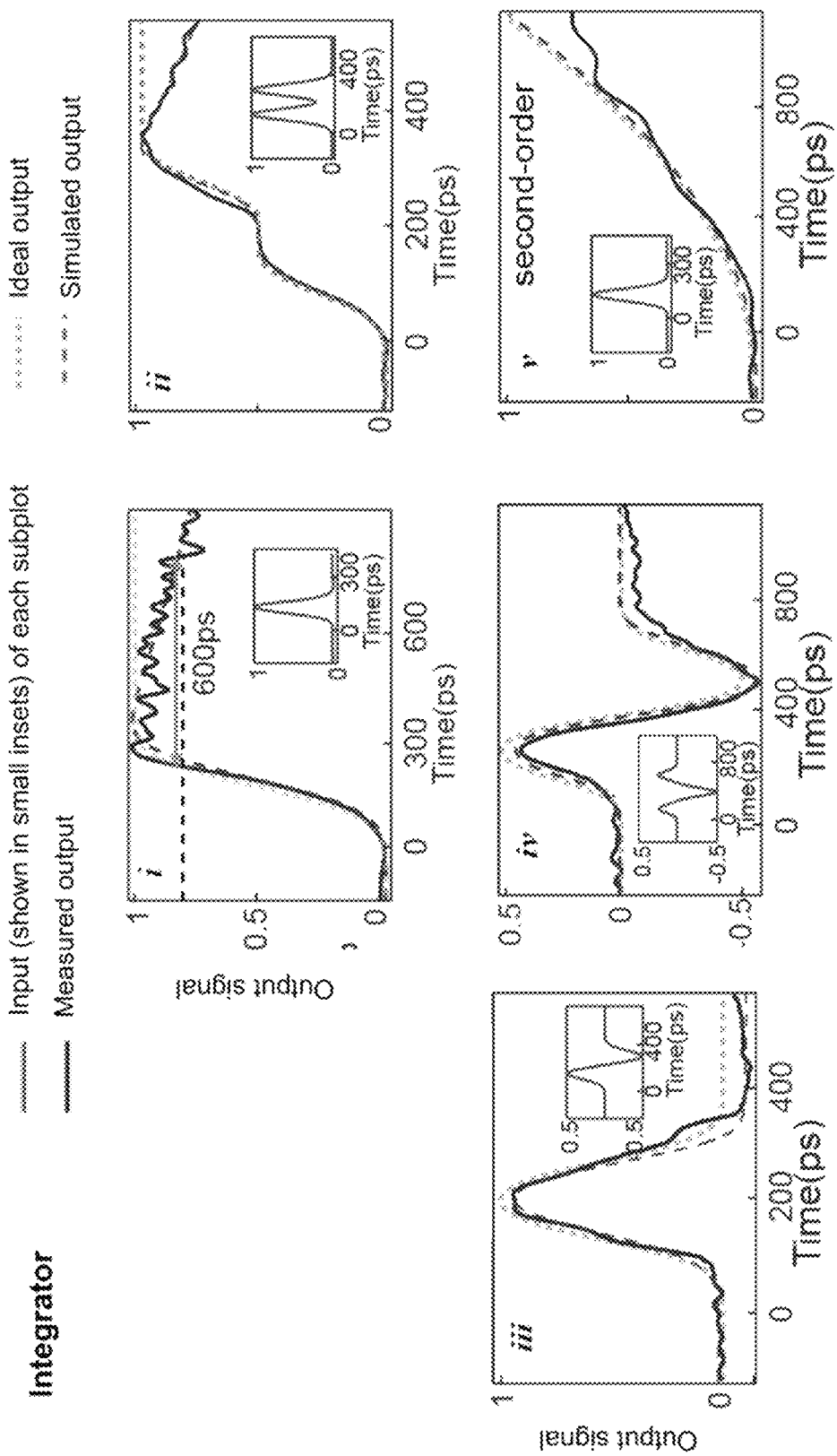

We first test the basic performance of our first-order integrator by injecting a Gaussian pulse with a FWHM of 90 ps. The output signals in FIG. 2E (i) clearly show a step-like waveform with an integration time up to ~600 ps (defined as the decay time to reach 80% of the maximum intensity [8]), consistent with our resonator lifetime. Using resonators with even higher Q-factors could further increase the integration time, at the expense of lower throughput due to narrower resonance linewidths (or operation bandwidths) [1]. Next, we demonstrate coherent integration of more advanced waveforms by injecting in-phase (ii) and out-of-phase (iii) doublet pulses, as well as triplet pulses (iv), the corresponding results of which are shown in FIG. 2E. Specifically, the results for the in-phase doublet pulses (ii) feature a clear double-step function due to the constructive addition of the two waveforms, and the duration time of the step profile matches the interval between the two pulses. Such functions could potentially find applications in high-speed bit counting. In contrast, when the two pulses are out of phase (iii), the time integral of the second optical pulse cancels with that of the first one, leading to a rapid return to the baseline. Different duration time can be readily obtained by setting the position of the second pulse to realize the signal memory function [28]. We then input a more complex triplet pulse (iv) to verify the capability of processing complicated RF signals, the result of which shows an average accuracy of 96.06% compared with the simulated output. Based on the results of the first-order temporal integrator, we further demonstrate second-order integration function by cascading two microring resonators with aligned resonance peaks (FIG. 2D) (see Section B.3). When injecting a single Gaussian pulse (FWHM ~120 ps), the corresponding output (FIG. 2E, v) matches well with the simulation prediction, with an average accuracy of 96.03% within the device lifetime, and shows a much longer rise time than the duration of the input pulse, indicating the effective realization of second-order integration function.

Figure 2G:
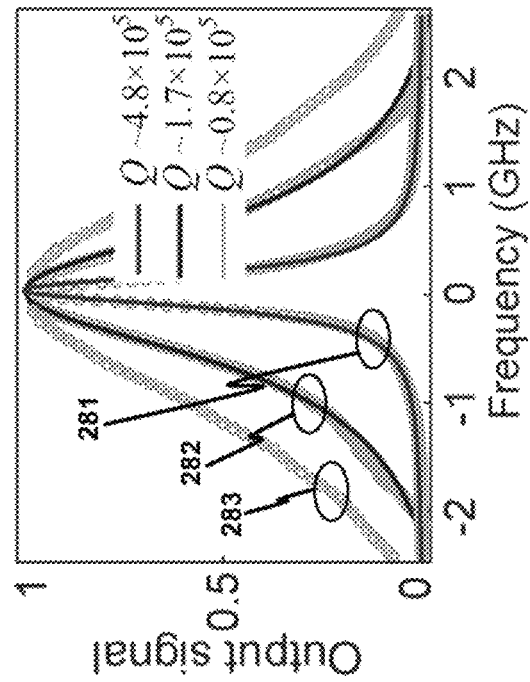
Figure 2F:
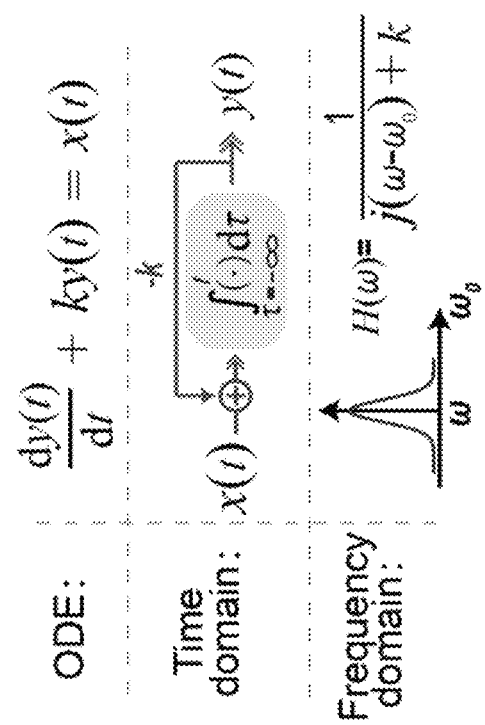
Figure 2H:
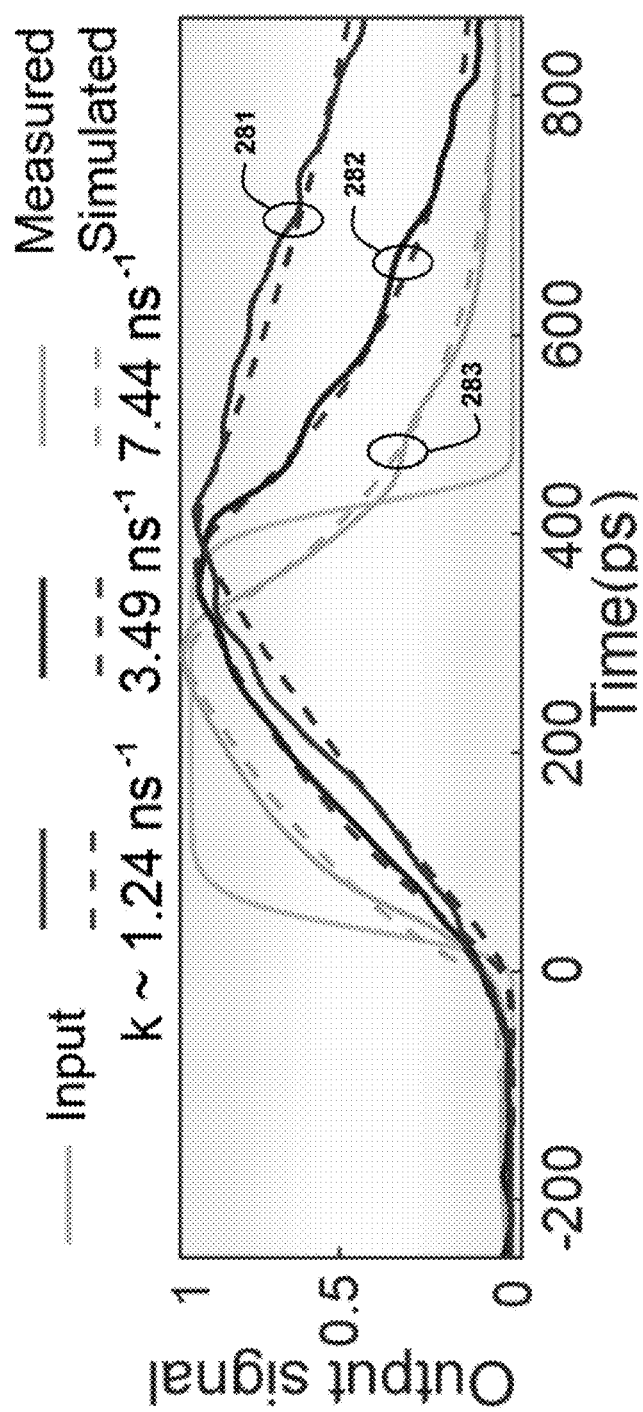

We then apply this integrator to showcase our first MWP application, i.e. solving ODEs for high-speed electronic signals, expressed as: $dy(t)/dt+ky(t)=x(t)$, where x(t) represents the input RF signal, y(t) is the solution to be determined, and k represents an arbitrary constant [5]. This basic ODE can be utilized to model a broad range of basic engineering systems and physical phenomena, such as temperature diffusion processes and automatic control systems [5], [29]. The process of solving this ODE in the time domain could be described canonically as an integration function embedded inside a feedback loop, which is equivalent to a Lorentzian transfer function of $H(\omega)=1/(j(\omega-\omega_0)+k)$ in the frequency domain (FIG. 2F). We achieve this transfer function again using an add-drop ring resonator, where the loaded Q factor determines the constant k in the ODE [5] (see Section B.3). As a proof of concept, we fabricate and test three different ring resonators with Q factors of $4.8\times10^5$, $1.7\times10^5$, and $0.8\times10^5$ by controlling the coupling gaps (FIG. 2G), corresponding to k values of 1.24 $ns^{-1}$, 3.49 $ns^{-1}$ and 7.44 $ns^{-1}$, respectively. (The three cases of Q factors of $4.8\times10^5$. $1.7\times10^5$, and $0.8\times10^5$ are shown in FIG. 2G under reference labels 281, 282, 283, respectively.) During the testing, we use 400 ps super-Gaussian pulses as input signals to better distinguish the solutions from the input [29]. The respective results with different k constants in FIG. 2H show excellent agreement with simulated solutions (dashed lines) obtained by an ideal ODE solver, with an average computation accuracy of 98.10%. (The three cases of k values of 1.24 $ns^{-1}$, 3.49 $ns^{-1}$ and 7.44 $ns^{-1}$ are shown in FIG. 2H under reference labels 281, 282, 283, respectively.) Compared with algorithms in traditional electronics that require multiple iterations, our MWP system solves the ODE almost instantaneously as photons pass through, significantly improving the processing speed while maintaining excellent computation accuracy. Further equipping the resonators with TO or EO tunable couplers to actively control the loaded Q factor could enable a tunable ODE solver with variable coefficients to address more complex practical application scenarios [30].

A.2. High-Speed Microwave Photonic Temporal Differentiator

Figure 3A:
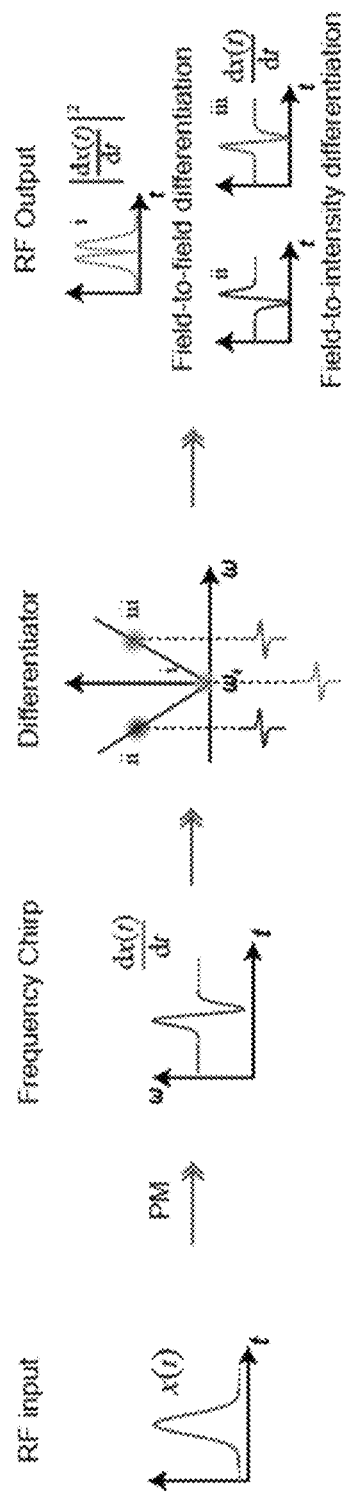

The second demonstrated high-speed MWP computation task is temporal differentiation, which takes the derivative of the input microwave signal and output in the form of optical field or intensity. Here, we deploy a frequency-chirp-based differentiation scheme [3] leveraging an EO phase modulator and an MZI-based differentiator on the LN platform (see Section B.4). The basic working principle is shown in FIG. 3A: the input RF signal x(t) is first loaded on a continuous-wave optical signal by the phase modulator, leading to an instantaneous optical phase of $\omega_0+\beta x(t)$, where $\omega_0$ is the carrier frequency of the signal and $\beta$ is the modulation index. This induces an instantaneous frequency chirp of $\omega_0+\beta \cdot dx(t)/dt$ that exactly follows the differentiation of the input signal dx(t)/dt. The chirped frequency information is then mapped into optical field or intensity using an unbalanced MZI, which is carefully designed to provide the desired frequency response. Specifically, we achieve field-to-field (field-to-intensity) differentiation by biasing the MZI at the null (quadrature) point, where the output optical field (intensity) is linearly proportional to the optical frequency [3]. The top panel of FIG. 3C shows the measured transfer function of the fabricated unbalanced MZI as a first-order differentiator, consistent with the ideal linear response within a processing bandwidth of 40 GHz, limited by FSR. Even higher processing bandwidths could be achieved using MZIs with larger FSR, however, at the expense of lowered differentiation efficiency (determined by the spectral slope of the transfer function) [3]. We could also achieve second-order differentiation by cascading two unbalanced MZIs with aligned null wavelengths, the transfer function of which is shown in the bottom panel of FIG. 3C with a faithful processing bandwidth of 30 GHZ.

Figure 3B:
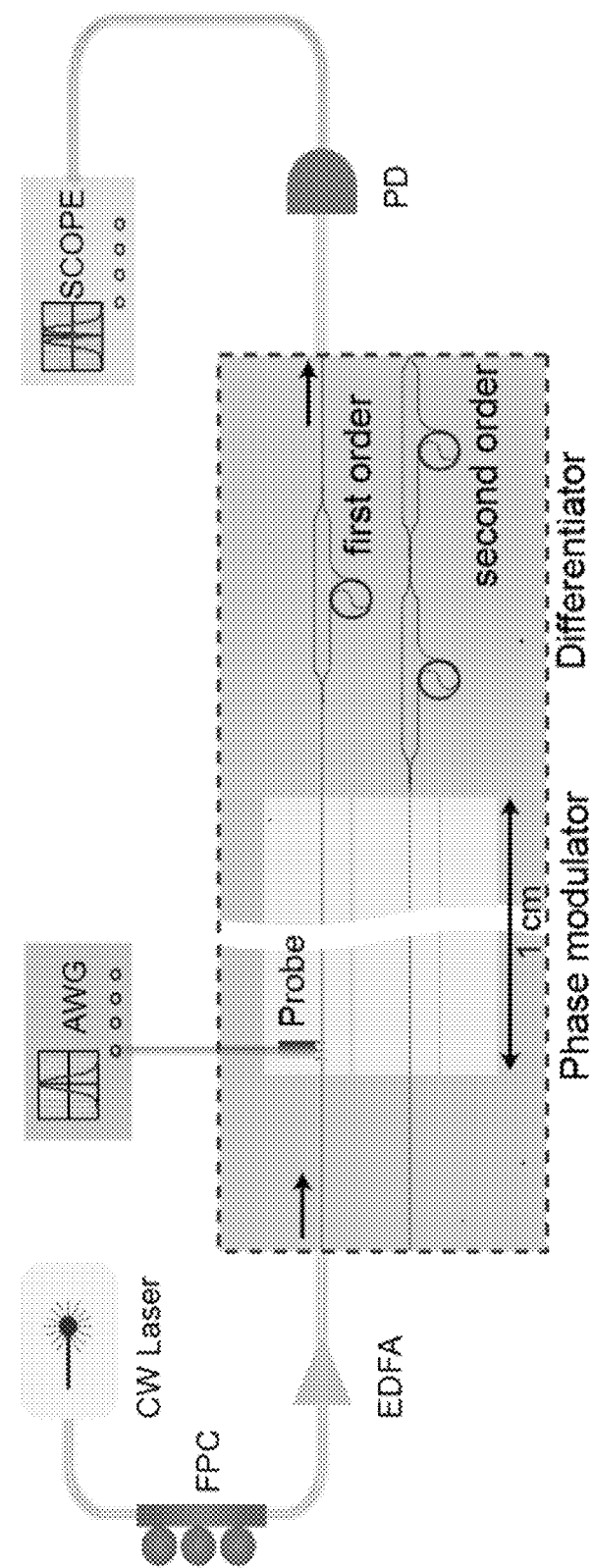
Figure 3C:
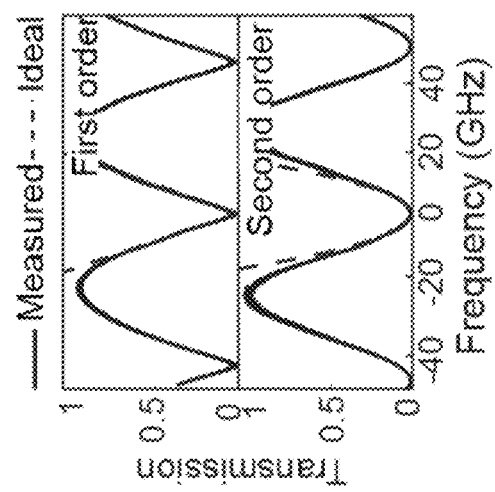
Figure 3D:
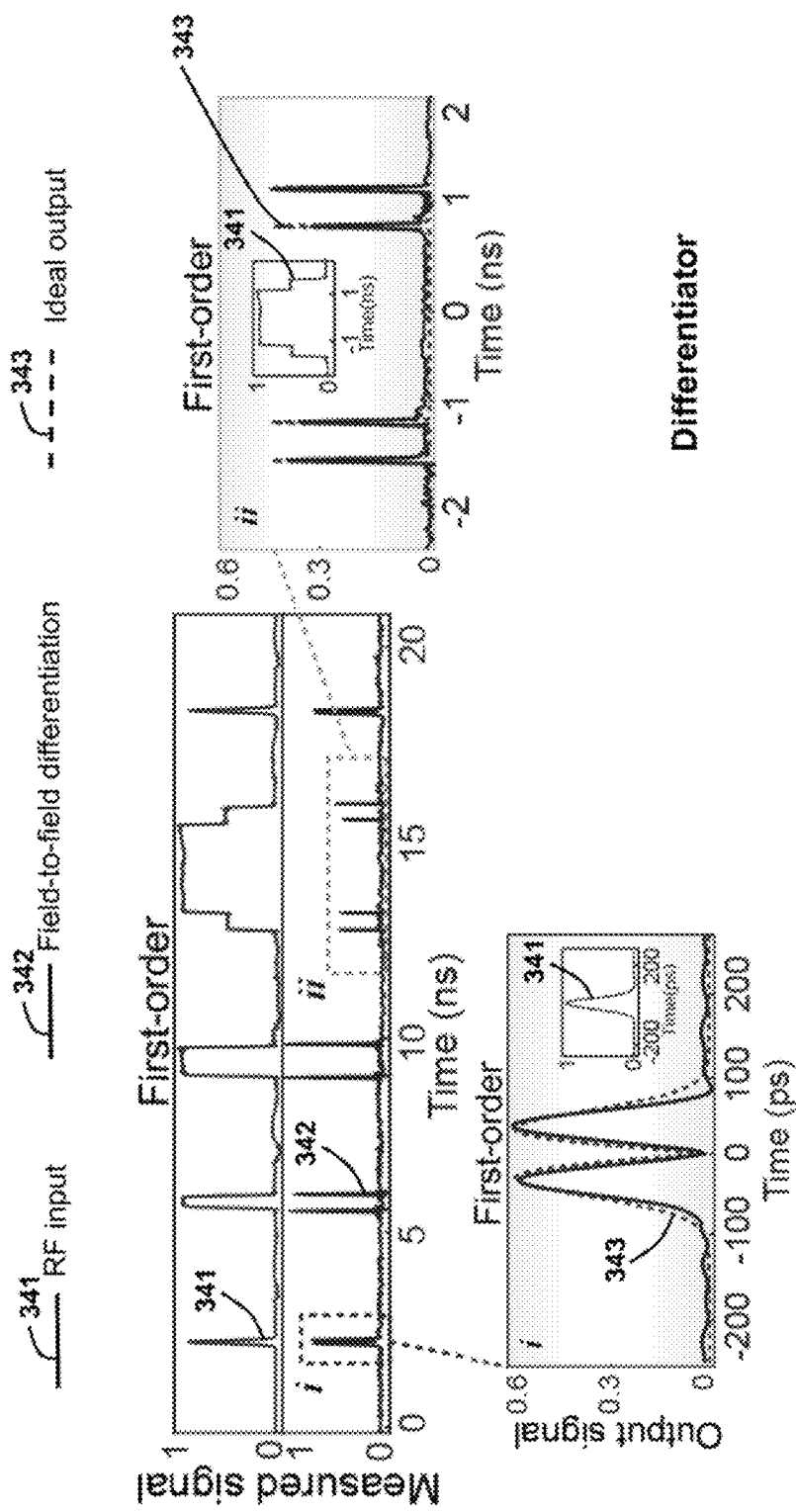
Figure 3E:
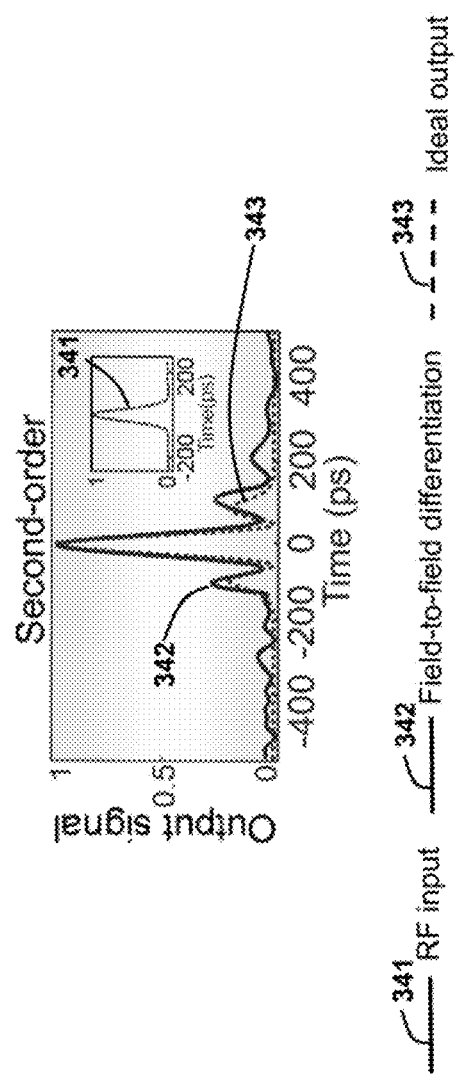

As shown in FIG. 3D, we test the field-to-field differentiation performance by injecting a sequence of RF signals 341 including Gaussian pulses (FWHM ~90 ps, 120 ps), square pulses (FWHM ~300 ps, 500 ps) and stepped pulses into the phase modulator, using the experimental setup shown in FIG. 3B. FIG. 3D shows the corresponding measured output differentiation results 342, where the pulse height is determined by the temporal rising/falling slope of input signals. Here the output signals are positive for both rising and falling edges since the differentiation result in the form of optical field is measured by a direct intensity detection at the PD showing $|dx(t)/dt|^2$. The subplots of FIG. 3D show blow-up views of input and output waveforms together with the ideal ones 343, showing an average accuracy of 96.47%. The slight mismatch is mainly originated from the limited analog bandwidth of our AWG (see Section B.4). We further test the second-order field-to-field differentiation performance by injecting a 120 ps Gaussian pulse to the cascaded MZI device (FIG. 3E), which also shows good agreement with the expected result.

Figures 3F, 3G:
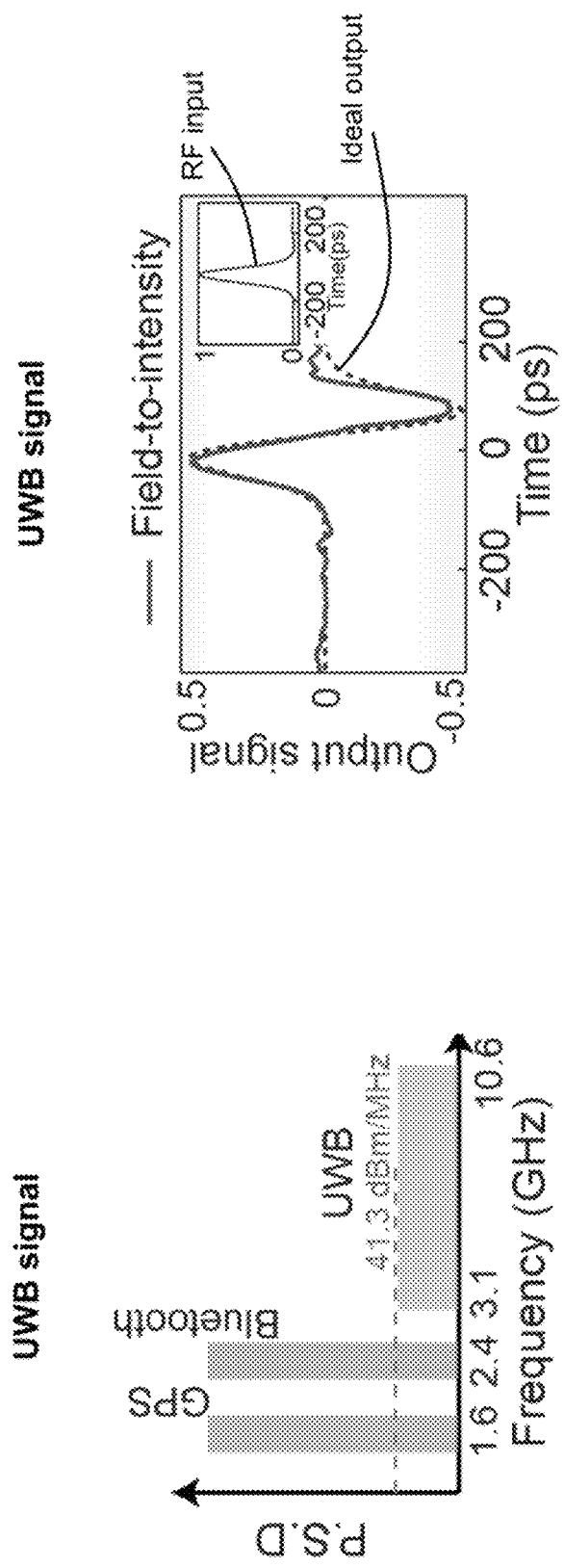
Figure 3H:
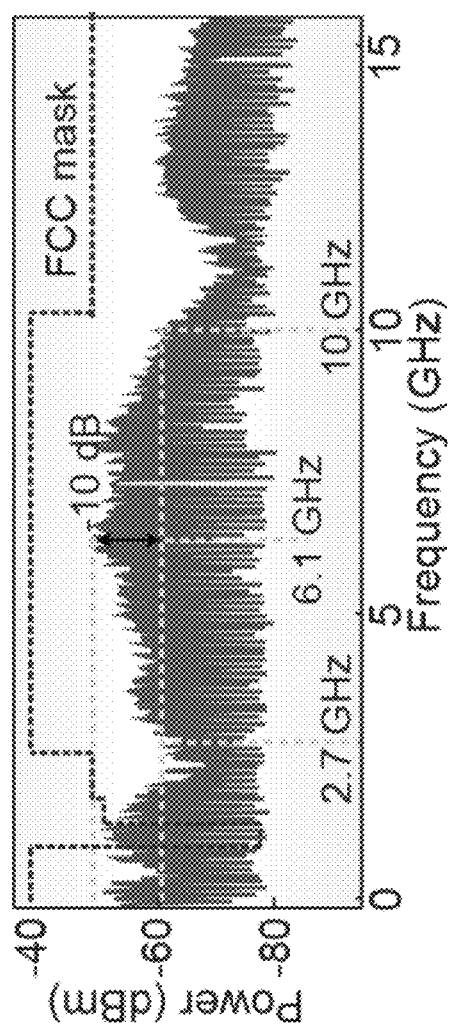

One attractive MWP application based on the differentiator is the generation of UWB signals, an emerging wireless protocol with wide bandwidth (3.1-10.6 GHZ) and low power spectral density (<41.3 dBm/MHz) for short-range high-throughput wireless communications and sensor networks (FIG. 3F). Here we demonstrate the generation of UWB carrier pulses by performing field-to-intensity differentiation to Gaussian monocycle pulses (FIG. 3G) (see Section C.1). The differentiation results in this case are carried by optical intensity and measured through a homodyne detection similar to that used in field-to-intensity integration, showing an anti-symmetric doublet pulse with an average accuracy of 97.42% compared with the ideal response. The corresponding RF spectrum of the output UWB pulse is shown in FIG. 3H, featuring a center frequency of 6.1 GHZ and a 10 dB bandwidth of 7.3 GHZ, with a fractional bandwidth of 120%, in accordance with the FCC regulations. The demonstrated UWB signal generation on our LN MWP platform could provide compact and cost-effective solutions for next-generation wireless communications and remote sensing systems with seamless compatibility with optical networks.

A.3. High-Speed Photonic-Assisted Image Segmentation System

Figure 4A:
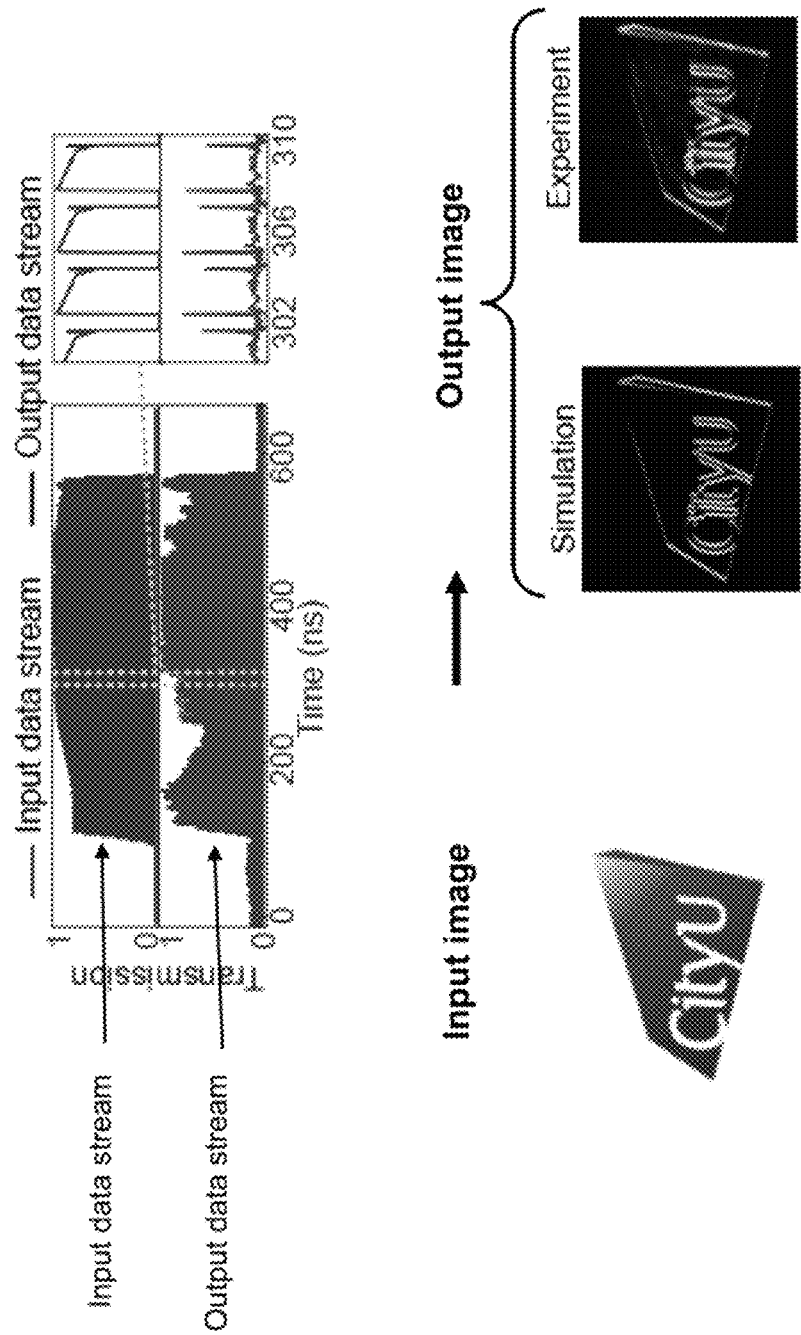

Finally, we show our high-speed LN photonic processing engine could enable applications beyond traditional MWP-related scenarios. As an example, we realize a photonic-assisted image edge detector for segmentation of medical images, which can provide quantitative analysis to help clinicians conduct accurate disease diagnosis and treatment. The extraction of image edge features is realized by performing field-to-field differentiation operations on a time-domain data stream serialized from 2D images (see Section C.1). We first showcase the power of our edge-feature detector by feeding the system with a 250×250-pixel 'CityU' logo, serialized as a 92GSa/s data stream. The temporal differentiation and edge detection functions are performed "on-the-fly" within a short time (250×250=92 GSa/s=679 ns) and captured by a real-time oscilloscope. We de-multiplex the captured time-series data back into matrix format to form the reconstructed image, showing clearly resolved edge features with 95.51% accuracy compared with the simulated results (FIG. 4A).

Importantly, the demonstrated image processor is three orders of magnitude faster and consumes lower power than performing traditional algorithms in an electronic computer (see Section C.4). The processing speed is currently limited by the sampling rate of our AWG and could be readily increased to at least 200 GSa/s considering the large analog bandwidth of our EO modulators deep into the millimeter-wave band [16].

Figure 4B:
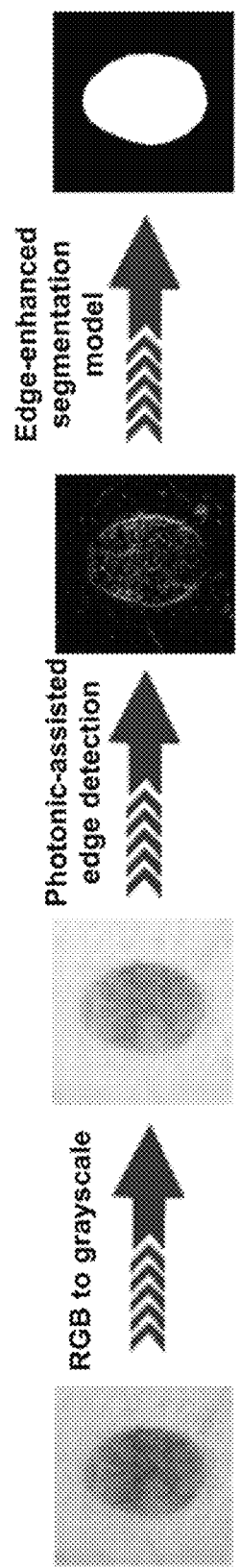
Figure 4C:
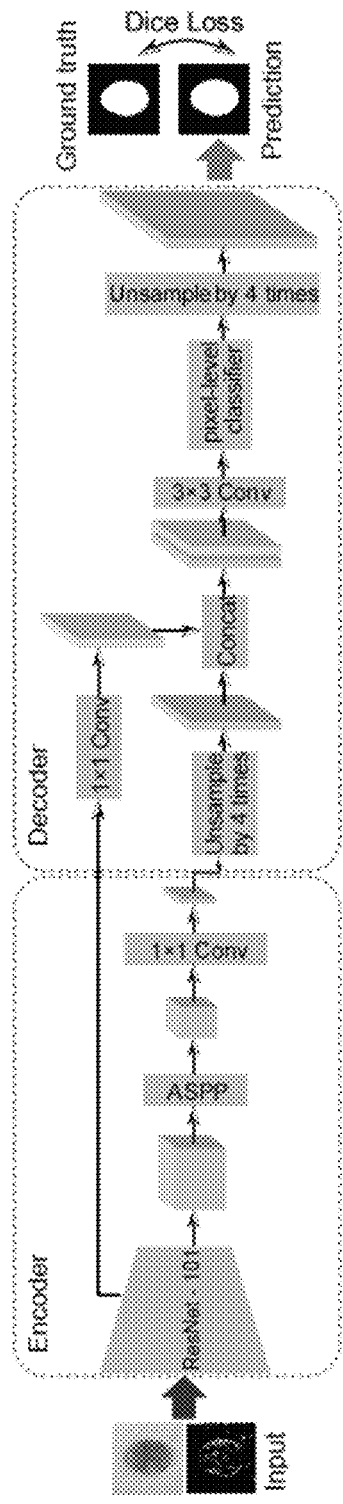
Figure 4D:
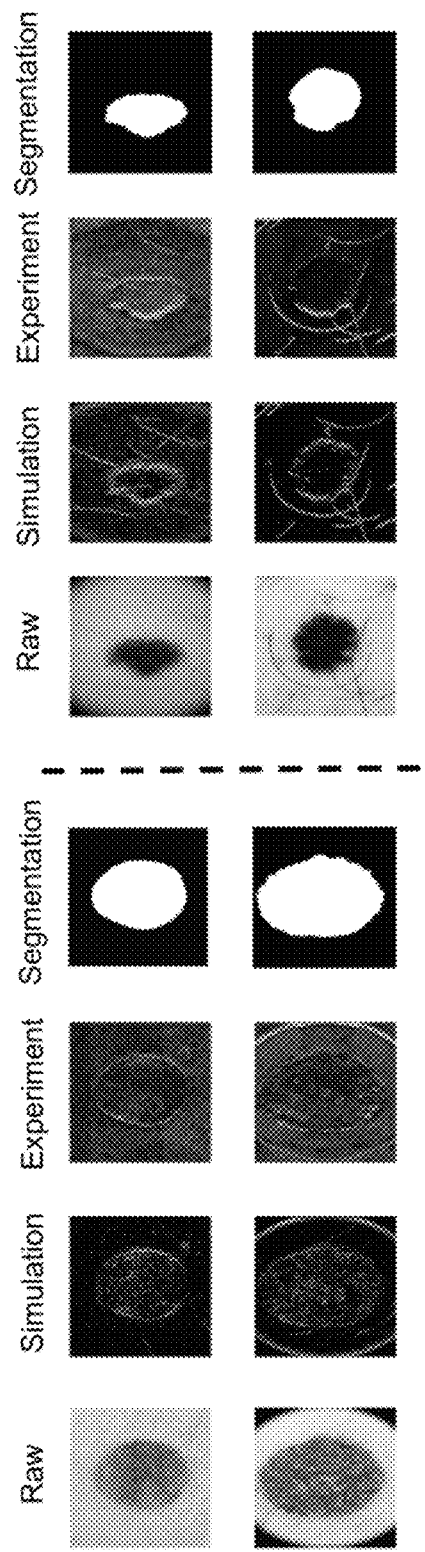

We then plug our high-speed photonic-assisted image edge detector into a DCNN-based image segmentation model for outlining the boundaries of melanoma lesion in medical diagnostic images with superior processing speed, power consumption and accuracy. When processing complex and often low-contrast medical images, the fuzzy boundaries between abnormal and normal regions could lead to predictions with compromised accuracies. This situation could be substantially improved by feeding the DCNN with edge-detected information instead of original images, which can be integrated into an arbitrary encoder-decoder architecture in an end-to-end way for medical image segmentation process. FIGS. 4B and 4C illustrate the flow diagram and working principle of the proposed edge-enhanced DCNN segmentation model that intakes raw RGB images and outputs segmentation results (see Section C.4). To optimize the segmentation model, we first train the model with concatenated dermoscope images and the corresponding melanoma edge information derived from simulated differentiation, emphasizing the representations around melanoma lesion boundaries. Based on the optimized model, the test dermoscope images are concatenated with experimentally extracted lesion edge information to generate the melanoma region prediction. FIG. 4D shows the original melanoma lesion images captured from dermoscope, simulated and experimentally measured edge features, as well as the lesion regions segmented by our model, respectively. The tested average segmentation accuracy of our edge-facilitated model is 95.44%, proving the effectiveness of the proposed photonic-assisted segmentation model. Most importantly, the demonstrated LN photonic-assisted image edge detector features much higher computation speed and lower power consumption compared with traditional electronics (see Section C.4), which will pave the path for high-complexity, high-throughput and real-time medical diagnosis tasks. The functional toolbox of our LN photonic image processing engine could be further expanded and parallelized leveraging the excellent scalability of our platform, leading to more advanced functions like matrix multiplication and enabling a variety of future photonics-enabled AI and computer vision technologies.

A.4. Remarks

In summary, we have designed, fabricated and demonstrated a high-fidelity and low-power-consumption integrated microwave signal processing system that performs temporal integration and differentiation operations for high-speed electronic signals up to 92 GSa/s, enabling a variety of applications including ODE solving, UWB signal generation and edge detection of images. In particular, our photonic-assisted image segmentation model proves to be more powerful and efficient for disease diagnosis tasks, bringing exciting opportunities for intersections between integrated MWP technology and medical diagnosis. The performance of the current system can be further improved, by utilizing microresonators with even higher Q factors [39] to prolong the integration time to nanoseconds [1], and MZIs with larger FSR to further increase the bandwidth of differentiation operation. The reconfigurability and programmability of our LN-based on-chip MWP signal processing system could be further enhanced by equipping TO or EO tuning sections on the processing blocks to allow real-time switching among processing functions and active tuning of the processing bandwidth for task-oriented applications [1].

Adoption of multiple input/output ports with controllable (de-) multiplexers could enable parallel linear processing [31] and space-division multiplexing [32]. Importantly, our demonstrated MWP system is highly compatible with other high-performance photonic components available on the integrated LN platform, such as microcombs [33], frequency shifters [24], and true delay lines [25], which could be further integrated towards even more advanced MWP functionalities. Meanwhile, we expect other components of the MWP system, such as low-noise laser sources, high-power handling PDs, electronic integrated circuits, and microwave amplifiers, could be assembled on the LN platform through heterogeneous integration schemes, leading to highly compact, cost-effective and high-performance integrated MWP systems for next-generation communications and information technologies.

B. Methods as Employed by the Multi-Purpose MWP System

B.1. Design and Fabrication of the Devices

Devices are fabricated from a commercially available x-cut LNOI wafer (NANOLN), with a 500 nm LN thin film, a 2 μm buried $SiO_2$ layer, and a 500 μm silicon substrate. $SiO_2$ is first deposited on the surface of a 4-inch LNOI wafer as etching hard mask using plasma-enhanced chemical vapor deposition. Optical waveguides, MZIs and microring resonators are then patterned on the entire wafer using an ASML UV Stepper lithography system (NFF, HKUST) die by die (1.5 cm×1.5 cm) with a resolution of 400 nm. Next, the exposed resist patterns are transferred first to the $SiO_2$ layer using a standard fluorine-based dry etching process, and then to the LN device layer using an optimized Ar+ based inductively-coupled plasma reactive-ion etching process. The LN etch depth is ~250 nm, leaving a 250 nm-thick slab. After removal of the residual $SiO_2$ mask and redeposition, a second stepper lithography, metal evaporation and lift-off process are used to fabricate the microwave electrodes. The positive and negative electrodes are spaced by a gap of 5 μm to ensure strong EO coupling while minimizing metal-induced optical losses. Finally, chips are carefully cleaved for end-fire optical coupling with coupling loss ~4 dB per facet.

B.2. Characterization of the Building Blocks for MWP Signal Processing

More details are presented here for the LN building blocks as used in our MWP system (as shown in FIG. 1). For optical characterizations, a continuous-wave pump laser (Santec TSL-510) is sent to the devices under test using a lensed fiber after a polarization controller to ensure TE polarization. The output optical signal is collected using a second lensed fiber and sent to a 125-MHz PD (New Focus 1811) for low-frequency measurements. The optical transmission of the racetrack resonator (width ~2 μm) is fitted by a Lorentzian function, with a loaded Q factor >4 million, indicating a corresponding propagation loss below 0.1 dB/cm.

For the on-chip MZI modulator, the small-signal EO $S_{21}$ response is measured by injecting small RF signals from a vector network analyzer (VNA, Keysight N4373E) into the modulation electrodes via a high-speed probe (GGB industries) and monitoring the output signals captured by a high-speed PD (New Focus 1544) at various frequencies at the other port of the VNA. RF cable losses, probe loss and PD response are calibrated and de-embedded from the measured $S_{21}$ responses, with typical 3 dB EO bandwidths >40 GHz. Higher bandwidth could be obtained by micro-structured electrodes [34]. The measured low-frequency half-wave voltage ($V_\pi$) is 2.6V for a modulation length of 1 cm, corresponding to a voltage-length product of 2.6V·cm.

For the on-chip phase modulator, an optical frequency comb consisting of 15 combs could be obtained by driving the modulator with a strong 18 GHz microwave signal with an amplified power of 630 mW, corresponding to a total acquired phase shift of ~1.05π. The comb spectrum is measured by an optical spectrum analyzer (OSA, Yokogawa AQ6370).

To implement temporal integration, an over-coupled add-drop racetrack resonator with FSR ~80 GHz is fabricated, with a loaded Q-factor ~9×10$^5$ and near-unity on-resonance transmission measured at the drop port. For second-order integration, two cascaded racetrack resonators with different FSRs (80 GHz and 82 GHZ) are designed to align the two resonance peaks via Vernier effect. The envelop FSR is measured to be 26.24 nm, which is in line with the design value. For temporal differentiation, the asymmetrical MZI and cascaded MZIs are designed with FSR ~50 GHz to provide a reasonable balance between operation bandwidth and differentiation slope efficiency. The spiral waveguides are designed with a minimum radius of curvature of ~100 µm to minimize the footprint and limit excessive radiation loss.

B.3. Theoretical Development of the Microring-Based MWP Temporal Integrator and ODE Solver More details are presented here for the principles of microring-based temporal integrator and ODE solver. The integration results are represented in optical intensity changes on top of a DC intensity component when the amplitude modulator is biased at the quadrature point, which are captured by an AC-coupled high-speed PD. The optical field right after amplitude modulation can be expressed as:

$$E_{in}(t) = E_0 e^{j\omega_0 t} \cos[\beta x(t) + \varphi_0] \quad (1)$$

where $\beta$ is the modulation index defined as $\pi V_p/V_\pi$, $V_p$ is the peak voltage applied to the driving electrodes, $E_0$ is the input electric field amplitude, $\varphi_0$ is the bias phase of the amplitude modulator $-\pi/4$, $\omega_0$ is the optical carrier frequency and $x(t)$ is the normalized input microwave signal. Under small signal modulation ($\beta \ll 1$), the expression can be simplified as $$E_{in}(t) \approx \frac{\sqrt{2}}{2} E_0 e^{j\omega_0 t}[\beta x(t) + 1]. \quad (2)$$

After Fourier transformation is taken, the input signal can be rewritten in frequency domain as $$E_{in}(\omega) = F\left[\frac{\sqrt{2}}{2}\beta E_0 e^{j\omega_0 t} x(t)\right] + \frac{\sqrt{2}}{2} E_0 \delta(\omega - \omega_0). \quad (3)$$

After going through the integrator/ODE solver [$H(\omega)=1/(j(\omega-\omega_0)+k)$], the output signal can be written as $$E_{out}(\omega) = E_{in}(\omega)H(\omega) = \frac{F\left[\frac{\sqrt{2}}{2}\beta E_0 e^{j\omega_0 t} x(t)\right] + \frac{\sqrt{2}}{2} E_0 \delta(\omega - \omega_0)}{j(\omega - \omega_0) + k}. \quad (4)$$

When performing integration operations, we use microring resonators with high Q-factors ($k\approx 0$), such that the output signal after inverse Fourier transformation back to the time domain is $$E_{out}(t) = \quad (5)$$

$$F^{-1}[E_{out}(\omega)] \approx F^{-1}\left\{\frac{F\left[\frac{\sqrt{2}}{2}\beta E_0 e^{j\omega_0 t} x(t)\right]}{j(\omega - \omega_0)} + \frac{\frac{\sqrt{2}}{2} E_0 \delta(\omega - \omega_0)}{k}\right\} = \frac{\sqrt{2}}{2}\beta E_0 e^{j\omega_0 t} \int x(t)dt + \frac{\sqrt{2}}{2} e^{j\omega_0 t} \frac{E_0}{k}.$$

The output current of the PD could then be written as $$I_{out}(t) \propto \Re|E_{out}(t)|^2 = \frac{\Re E_0^2}{2k^2} + \frac{1}{2}\Re \beta^2 E_0^2 \left[\int x(t)dt\right]^2 + \frac{\Re \beta E_0^2}{k}\int x(t)dt \approx \frac{\Re \beta E_0^2}{k}\int x(t)dt \quad (6)$$

where $\Re$ is the responsivity of the PD. Here the AC-coupled PD only responds to the third term in EQN. (6) since the first term is time-invariant and the second term is small for small signals. Therefore, the output signal of the PD directly corresponds to the integration result [$I_{out}(t) \propto \int x(t)dt$], which is generally the case for all field-to-intensity integration and differentiation results in this work.

On the other hand, when the internal decay loss of the ring resonator is non-negligible ($k\neq 0$), the output signal can be rewritten as $$E_{out}(t) = \quad (7)$$

$$F^{-1}[E_{out}(\omega)] \approx F^{-1}\left\{\frac{F\left[\frac{\sqrt{2}}{2}\beta E_0 e^{j\omega_0 t} x(t)\right]}{j(\omega - \omega_0) + k} + \frac{\frac{\sqrt{2}}{2} E_0 \delta(\omega - \omega_0)}{k}\right\} = \frac{\sqrt{2}}{2}\beta E_0 e^{j\omega_0 t} e^{-kt}\int e^{kt} x(t)dt + \frac{\sqrt{2}}{2} e^{j\omega_0 t} \frac{E_0}{k}.$$

The output PD signal is then given by $$I_{out}(t) \propto \Re|E_{out}(t)|^2 = \frac{\Re \beta E_0^2}{k} e^{-kt} \int e^{kt} x(t)dt \propto e^{-kt}\int e^{kt} x(t)dt \quad (8)$$

which is the solution of the first-order ODE solved in the present disclosure.

B.4. Theoretical Development of the MZI-Based MWP Temporal Differentiator

More details are presented here for the temporal differentiator. After loading the electronic signal into LN phase modulator, the electric field can be expressed as $$E_{in}(t) = E_0 e^{j\omega_0 t + j\beta x(t)} \quad (9)$$

where $\beta$ is modulation index defined as $\pi V_p/V_\pi$. Here $V_\pi$ corresponds to the half-wave voltage of a phase modulator. We achieve field-to-field differentiation when the MZI-based differentiator is biased at the null point with a frequency-domain transfer function of $j(\omega-\omega_0)$. The output signal in frequency domain can then be written as $$E_{out}(\omega) = E_{in}(\omega)H(\omega) = j(\omega - \omega_0)E_{in}(\omega). \quad (10)$$

Converting the output signal back into time domain through an inverse Fourier transformation yield $$E_{out}(t) = F^{-1}[E_{out}(\omega)] = \frac{dE_{in}(t)}{dt} - j\omega_0 E_{in}(t) = j\beta\frac{dx(t)}{dt}E_0 e^{j\omega_0 t + j\beta x(t)}. \quad (11)$$

Here since the output differentiation result is represented as optical field without a constant DC component, the PD picks up the output intensity which represents the square of the calculated derivative:

$$I_{out}(t) \propto \Re|E_{out}(t)|^2 = \Re\beta^2 E_0^2 \left[\frac{dx(t)}{dt}\right]^2. \quad (12)$$

As a result, all measured signals for field-to-field differentiation processes in this work are positive only.

On the other hand, we achieve field-to-intensity differentiation when biasing the MZI at the quadrature point. For simplicity, we assume the slope of the transfer function to be 1, in this case the output signal in frequency domain can be written as $$E_{out}(\omega) = E_{in}(\omega)H(\omega) = (\omega - \omega_n)E_{in}(\omega) \quad (13)$$

where $\omega_n$ is the null point of the MZI-based differentiator. Then convert the output signal back into time domain by an inverse Fourier transformation:

$$E_{out}(t) = F^{-1}[E_{out}(\omega)] = -j\frac{dE_{in}(t)}{dt} - \omega_n E_{in}(t) = \quad (14)$$

$$\left[(\omega_0 - \omega_n) + \beta\frac{dx(t)}{dt}\right]E_{in}(t).$$

The output intensity captured by the PD is then given by $$I_{out}(t) \propto \Re|E_{out}(t)|^2 = \Re\left[(\omega_0 - \omega_n) + \beta\frac{dx(t)}{dt}\right]^2 E_0^2 = \quad (15)$$

$$\Re E_0^2 \left\{(\omega_0 - \omega_n)^2 + \beta^2\left[\frac{dx(t)}{dt}\right]^2 + 2\beta(\omega_0 - \omega_n)\frac{dx(t)}{dt}\right\}$$

where only the third term is effectively picked up by the AC-coupled PD under small signal modulation ($\beta \ll 1$), similar to the field-to-intensity integration case. Therefore, the expression can be simplified as $$I_{out}(t) \approx 2\beta\Re E_0^2(\omega_0 - \omega_n)\frac{dx(t)}{dt}. \quad (16)$$

C. Experiment

C.1. Methodologies of the Integration, Differentiation and Image Edge-Detection Experiments In our experiment, different analog signals are pre-encoded by an arbitrary waveform generation (AWG, Keysight M8196A) and loaded into the LN-based on-chip MWP system using the same high-speed photonic chip measurement setup as discussed before. Continuous wave optical carrier from the tunable laser is first amplified using an EDFA (JDS Uniphase, C-band) before sending into the chip thanks to the high power-handling capability of our LN devices, therefore minimizing the additional noise from EDFA when amplifying small signals. The output light of the LN chip is detected by a photoreceiver (New Focus 1544) and sent to a high-speed oscilloscope (DSO-X 91604A) for signal analysis. For the temporal integrator experiment, the analog signals are combined with a DC bias voltage through a bias-tee to keep the MZI modulator at the quadrature point. The laser wavelength is fine tuned to align with the corresponding operating wavelengths of the integrators and differentiators. For UWB generation, the output spectrum is measured using an RF spectrum analyzer (R&S, FSW43) from 100 MHz to 15 GHz.

The photonic-assisted image edge detector is based on the field-to-field differentiator, which benefits from the direct intensity detection at the PD. The image information is encoded into a time-domain signal by serializing the pixels into a sequence of pulses and output at a highest sampling rate of 92 GSa/s using the AWG. Note that the "broadened" edges in the experimental results are caused by the relatively low and unmatched sampling rate of our oscilloscope (40 GSa/s). To achieve the best edge detection results in the medical image processing experiments, we lower the sampling rate to 40 GSa/s to match with the sampling rate of the oscilloscope.

C.2. Image Segmentation Model and Training Process

More details are presented here for the principle of image segmentation model shown in FIG. 4C. We follow the network structure of DeepLabv3+, which is composed of an encoder and a decoder. The former incorporates a ResNet101, ASPP, and a 1×1 convolutional layer (conv) to extract deep features. The latter aims to recover the original image resolution and produce segmentation results. To optimize the segmentation model, we first collect simulated edge data for each medical image, which are concatenated together to feed into the encoder of the segmentation model, emphasizing the representations around melanoma boundaries. The deep features extracted from the encoder are then bilinearly up-sampled by a factor of 4 and concatenated with the corresponding low-level features from the ResNet101 backbone, which can preserve the detailed texture information, such as edges. These concatenated feature maps are further passed through a 3×3 convolutional layer, followed by a pixel-level classifier and a bilinear up-sampling operator, thereby deriving segmentation predictions. The obtained predictions are constrained by the dice loss [35]. By minimizing the dice loss, the optimized model has the ability to outline melanoma lesions given any test dermoscope images.

In implementation, we firstly construct a training dataset with 1000 dermoscope images, together with the corresponding simulated edge information and melanoma segmentation ground truths. Each dermoscope image is concatenated with its simulated edge data, and then the concatenated data are passed through the cascaded encoder and decode of the segmentation model, obtaining segmentation prediction from the output of the decoder. The resulting prediction is supervised by the corresponding segmentation ground truth through minimizing the computed dice loss. Our method is implemented with the PyTorch library. The input images are uniformly resized to 250×250 for training. The stochastic gradient descent optimizer is adopted with an initial learning rate of $10^{-5}$ for the pre-trained encoder and $10^{-4}$ for the rest trainable parameters within the segmentation model with random initialization. Polynomial learning rate scheduling is adopted with the power of 0.9. We choose a batch size of 8 and the maximum epoch number of 200 to guarantee the convergence of training.

C.3. Error Analysis and Performance Evaluation

Figure 5:
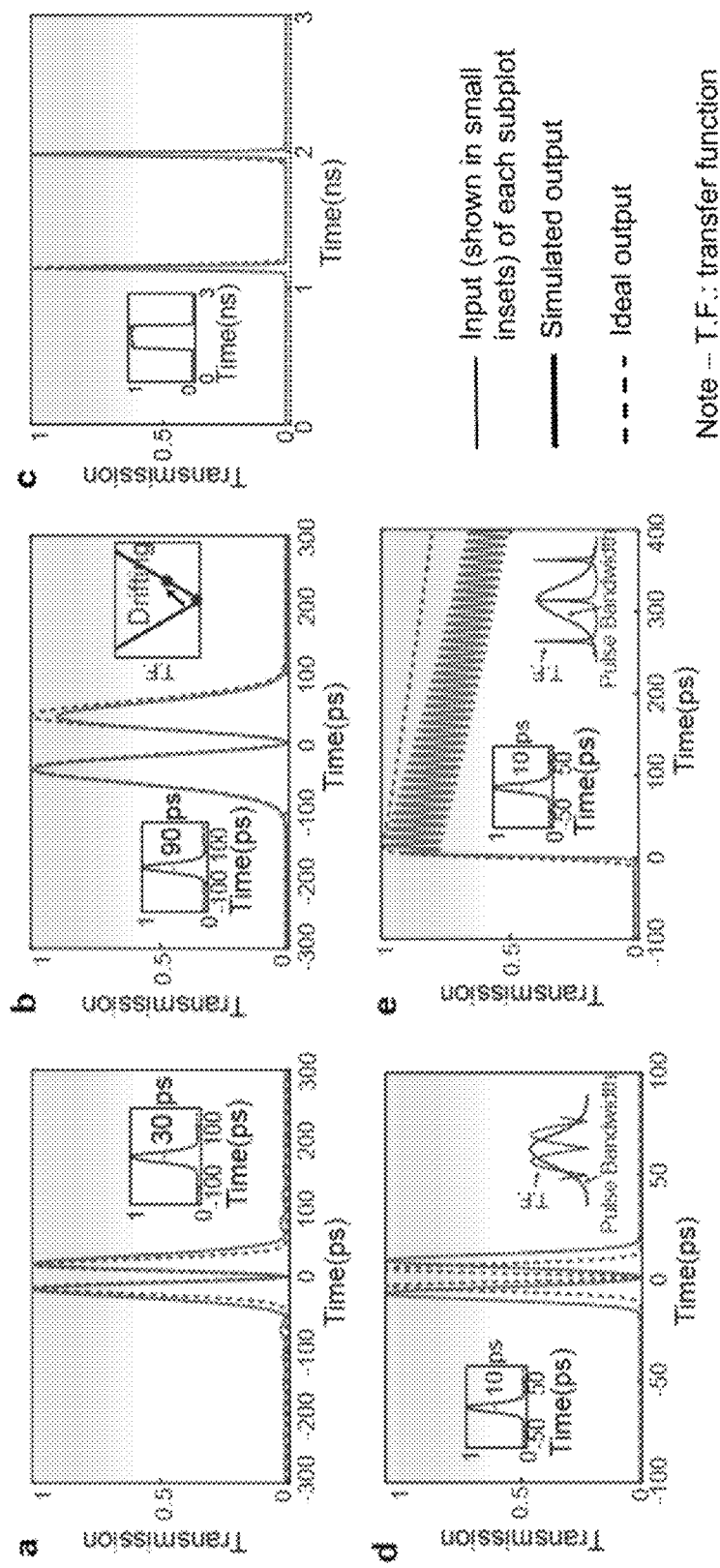
FIG. 5 provides error analyses based on simulated output signals with considerations of various practical limitations, including (a) limitation of equipment bandwidth, (b) drifting of device operation point. (c) intrinsic distortion of the input signals from AWG, as well as bandwidth limitations of the (d) MZI-based differentiator and (e) ring-based integrator.

All error analyses in this work are performed by calculating the MAE between the experimentally measured results and the ideal ones within the differentiation/integration time. We model and analyze the errors mainly from four sources.

i) Limited bandwidth of measurement devices. In our measurement setup, the 12 GHz PD does not faithfully capture the high-frequency components of the output signals, resulting in the distortion of output signal in time domain, as illustrated in subplot a of FIG. 5 in the case of a 30 ps Gaussian pulse. We expect the MAE to decrease from 15% to 3% if an ideal PD is used.

ii) Possible drift of device operation points. Subplot b of FIG. 5 demonstrates the simulated output result where the bias point for field-to-field differentiation drifts slightly by 3 MHz, which clearly exhibits an asymmetric doublet pulse for a 90 ps input Gaussian pulse.

iii) Intrinsic signal distortion from AWG. Adopting the actual 800 ps super-Gaussian pulse from our AWG as input signal, the simulated differentiation result shows pulses with different heights at the rising and falling edges in subplot c of FIG. 5. Using an ideal signal generator, the MAE could drop from 3.5% to 1.5%.

iv) Intrinsic processing bandwidths of the proposed integrator/differentiator devices. Taking a short 10 ps Gaussian pulse as an example (under the ideal test equipment), the pulse bandwidth is much broader than the FSRs of the ring-based integrator (80 GHz) or the MZI-based differentiator (50 GHz), leading to clear distortion of processing results shown in subplots d and e of FIG. 5.

Figure 6:
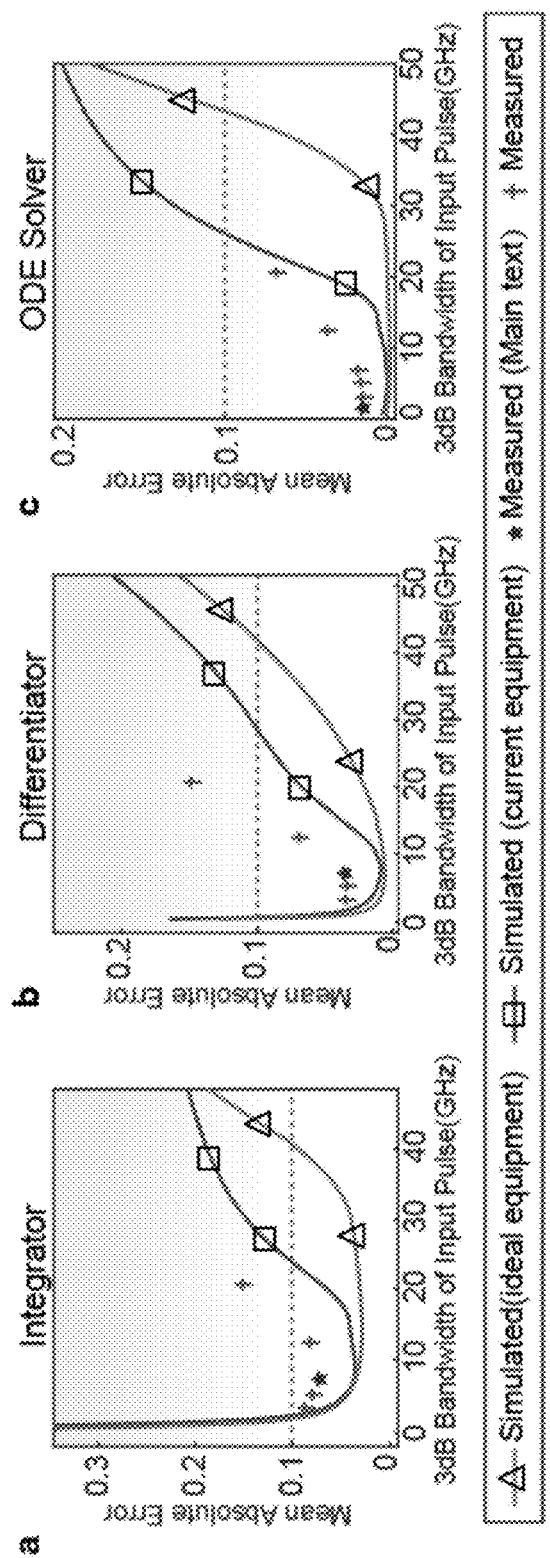
FIG. 6 depicts simulated and measured mean absolute errors as functions of the input pulse bandwidth for (a) the temporal integrator, (b) the temporal differentiator, and (c) the ODE solver.

In real applications, the proposed high-speed microwave signal processor should enable accurate signal processing within broad bandwidths. To evaluate the error performance, the measured transfer functions of the integrator, differentiator and ODE solver are utilized for error analysis. The simulated MAE values of these functional devices (FIG. 6) at different input signal bandwidths are analyzed by assuming ideal measured equipment and our current equipment, respectively, consistent with our measured error performances. Low computation errors of less than 10% (dash line) could be maintained within broad bandwidths of 1.5~40.7, 0.3~41.8 and 0~43.3 GHZ for the integrator, differentiator and ODE solver, respectively. The lower operation frequency bound of the integrator is mainly limited by the discrepancy between the ideal and actual transfer functions near the resonance wavelength (subplot c of FIG. 6), whereas the lower bound of the differentiator is limited by non-ideal device transfer functions near the null point of the MZI (e.g., finite extinction ratios). The upper bounds of operation frequencies for all three devices are limited by the FSRs of corresponding ring resonators/MZIs, as discussed in FIG. 5.

Figure 7:
FIG. 7 depicts images (a)-(e) related to edge-detection results a representative melanoma lesion, where image (a) is the original image, image (b) is the result based on using convolution, image (c) is the result based on using simple differentiation, and image (d) is the result obtained by using our photonic-assisted edge detector as disclosed herein, and image (e) is the ground truth.

C.4. Performance Comparison with Electronic Computer-Based Algorithms and Hardware Table 1 lists a detailed performance comparison between traditional electronics-based algorithms (including convolution-based and simple differentiation-based algorithms) and our photonic-assisted segmentation model. The performance metrics include raw lesion edge detection accuracy (from the edge detectors only, before DCNN), final segmentation accuracy (after DCNN), computation time, and energy consumption. The accuracies of lesion edge detection and segmentation are measured by dice coefficient. FIG. 7 shows the raw edge detection results of an example lesion image using different processing methods, together with the ground truth. Our photonic edge detector shows a better raw edge detection accuracy (23.5%) than those of both convolution-based (18.1%) and differentiation-based (12.8%) algorithms, mainly because it picks up less false-positive details inside the lesion region. The final image segmentation accuracies are above 95% for all three methods but with drastically different processing time. For edge feature extraction of a 250×250-pixel image, our device consumes a total computation time of 679 ns, nearly three orders of magnitude faster than performing a traditional convolution algorithm on a generic personal computer (380 μs).

When estimating the power consumption of electronics-based edge detection, we realize the challenges of quantifying the exact power consumption of DSP at the chip level, and only provide a lower-bound estimation by calculating the power consumed on the basic multiplication and addition operations of the edge-detection algorithms [36]. The energy consumption could be estimated as $$E_{ele} = T \cdot M \cdot [N \cdot E_M + (N-1) \cdot E_A] + (T-1) \cdot M \cdot E_A \quad (17)$$

where: T is the kernel number, which is typically 4 for a convolution algorithm and 2 for a differentiation algorithm; M is the image pixel number, which is 250×250 in this case; and N is the kernel size, which is 9 for the convolution algorithm and 3 for the differentiation algorithm. We assume 7 nm CMOS node is used for DSP chips, with an energy consumption per multiplication operation $E_M$~486 fJ/b and an energy consumption per addition operation $E_A$~60.8 fJ/b [37]. Therefore, the estimated total energy consumption for convolution algorithm is ~1227 nJ and for differentiation algorithm is ~201 nJ.

For our photonic-assisted method, we estimate the total energy dissipation on our photonic chip by including the power consumptions of the pump laser, modulator, as well as PD. The electrical energy dissipated can be estimated as [19], [36]-[38]

$$E_{pho} = E_{laser} + E_{mod} + E_{PD} \quad (18)$$

where $E_{laser}$ is the energy consumption from the pump laser, $E_{mod}$ is the energy consumption of the EO modulator, $E_{PD}$ is the energy consumption of the PD, and $E_{pho}$ is the total energy consumption of our photonic edge detector. Considering an optical power of 10 mW and a total processing time of 679 ns leads to $E_{laser}$~6.79 nJ. Furthermore, the EO modulator, which intakes a driving peak voltage of $V_p$=500 mV, consumes an average power consumption of $V_p^2/2R$=2.5 mW, where R=50Ω is the load impedance of the modulator [36]. It leads to an $E_{mod}$ value of ~1.7 nJ within the processing time. The energy consumption of the PD can be estimated as $\Re V_{bias} P_{rec}/B$ [38], where: $\Re$ is the responsivity of the PD~0.6 A/W; $V_{bias}$ is the PD bias voltage, which is ~3.3V; $P_{rec}$ is the received optical power, ~1 mW; and B is the information bit rate, ~40 Gbit/s. It leads to $E_{PD}$~3.1 nJ. The total energy consumption of our photonic edge detector, $E_{pho}$, is therefore estimated to be ~11.6 nJ.

TABLE 1

Performance comparison with traditional electronics-based algorithms.

|  | Differentiation algorithm | Convolution algorithm | This work |
|---|---|---|---|
| Raw lesion edge detection (1)(2) | 12.831% | 18.149% | 23.509% |
| Segmentation accuracy (1) | 95.602% | 95.888% | 95.437% |
| Computation time | 120 μs | 380 μs | 0.679 μs |
| Energy consumption | 201 nJ | 1227 nJ | 11.6 nJ |

(1) Detection and segmentation accuracies are measured by dice coefficient.
(2) Raw detection accuracy right after edge detection algorithms, before entering DCNN.

D. Embodiments of the Present Disclosure

Embodiments of the present disclosure are elaborated as follows based on the details, examples, applications, etc. as disclosed above.

An aspect of the present disclosure is to provide a MWP system for performing analog signal processing.

Figure 8:
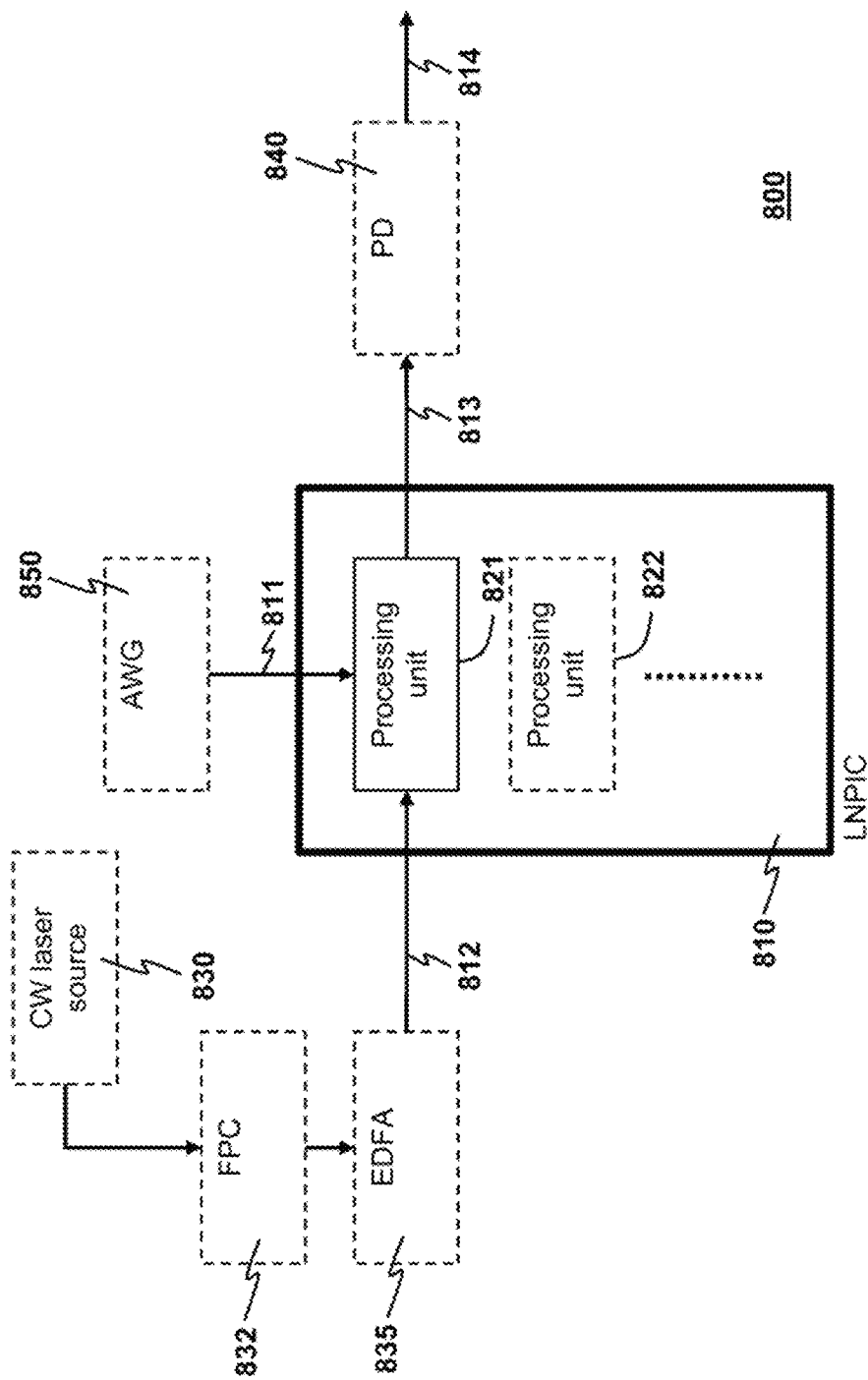
FIG. 8 depicts, for illustrating a MWP system as disclosed herein, a schematic diagram of an exemplary realization of the MWP system, where the exemplary MWP system includes a LNPIC formed with one or more processing units.

The disclosed MWP system is illustrated with the aid of FIG. 8, which depicts a schematic diagram of an exemplary MWP system 800.

The system 800 comprises a LNPIC 810. One or more processing units 821, 822 are formed in the LNPIC 810. The LNPIC 810 is a PIC fabricated on a wafer having thin-film LN (i.e. a wafer-scale LN platform). By forming the one or more processing units 821, 822 in the LNPIC 810, the one or more processing units 821, 822 form a part of the LNPIC 810. Such integration of all components that form the one or more processing units 821, 822 on a single LN chip offers advantages of, as mentioned above, ultrahigh-speed execution in analog signal processing, chip-scale integration, high fidelity, and low power at the same time. The Inventors' present work is the first time that all such components are put on the same chip.

An individual processing unit is used to process an analog electronic signal as an input to thereby generate an optical signal as an output. Without loss of generality, consider the processing unit 821 as a representative processing unit for illustration. The processing unit 821 is used to process an analog electronic signal 811 to yield an output optical signal 813. In particular, the processing unit 821 modulates the analog electronic signal 811 on an optical carrier signal 812 and then processes the resultant optical signal in the optical domain to generate the output optical signal 813. Optionally, instead of generating the output optical signal 813 only, the processing unit 821 may be configured to generate a plurality of output optical signals.

Figure 9:
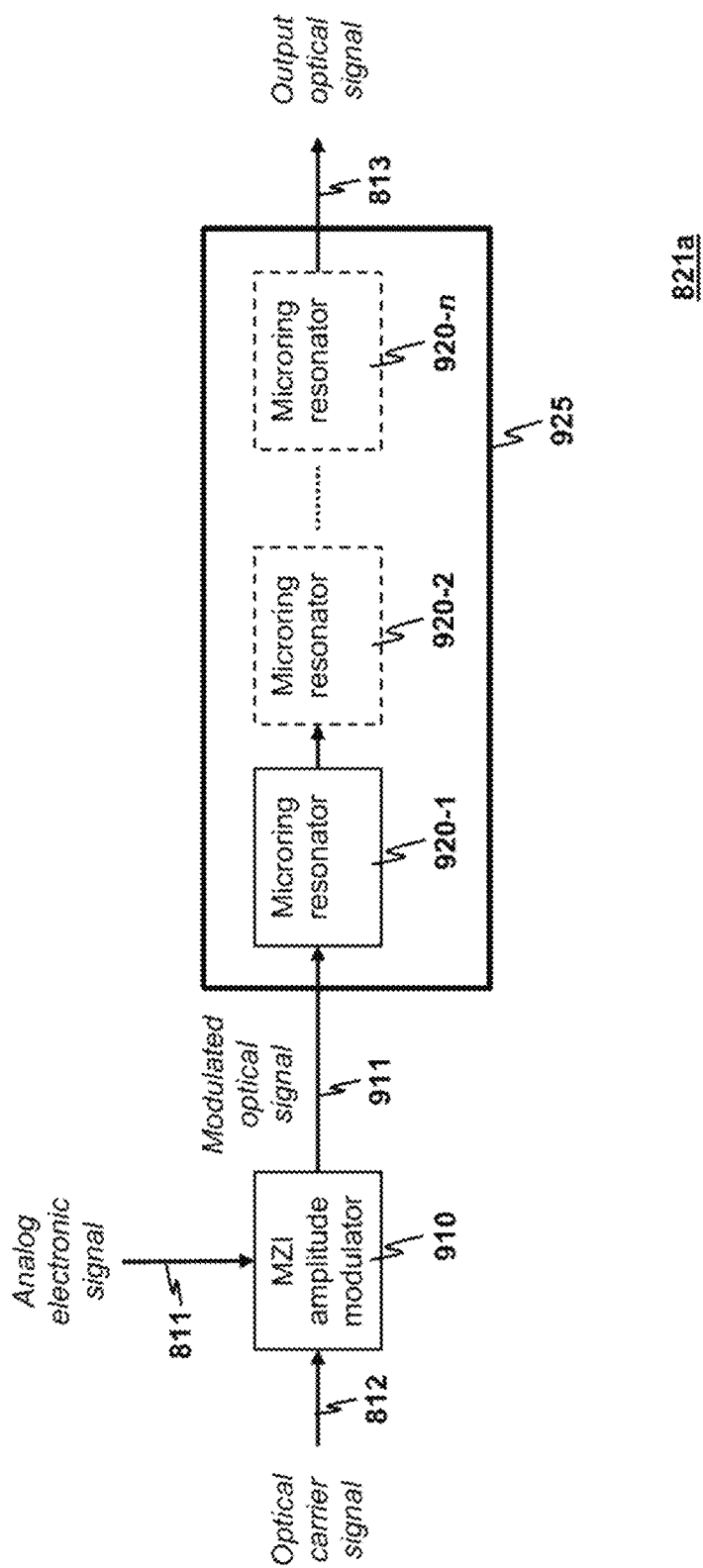
FIG. 9 depicts a first embodiment of a processing unit used in the exemplary MWP system, where the processing unit is used for realizing an nth-order integrator, $n \geq 1$, or a first-order ODE solver.

FIG. 9 depicts a first embodiment of the processing unit 821 (referenced as a first processing unit 821a for clarity). The first processing unit 821a is used for realizing an nth-order integrator, n≥1, or a first-order ODE solver as elaborated in Sections A.1 and B.3.

The first processing unit 821a comprises a MZI amplitude modulator 910 for modulating an optical field of the optical carrier signal 812 with the analog electronic signal 811 to yield a modulated optical signal 911. As a result, the information of the analog electronic signal 811 is embedded in the amplitude of the modulated optical signal 911. Additionally, the first processing unit 821a further comprises a set of n microring resonators 920-1: n where n is a total number of microring resonators in the set and is a predetermined positive integer at least 1. In particular, the n microring resonators 920-1: n are aligned in resonance peak and connected in series to form an optical circuit 925 used for processing the modulated optical signal 911 to yield the output optical signal 813. Note that the n microring resonators 920-1: n have aligned resonance peaks in case n>1. In case of n=1, the single microring resonator 920-1 is automatically deemed to be aligned in resonance peak.

In a first embodiment of the first processing unit 821a, an individual microring resonator (selected from the microring resonators 920-1: n) has a high Q factor. As used herein. "a high Q factor" is defined as a loaded Q factor that is at least 105 (see Section A.1). As a result, it causes an intensity of the output optical signal 813 over time to be proportional to an integration result obtained by performing an nth-order integration of the analog electronic signal 811 over time. In the special cases of n=1 and n=2, the first processing unit 821a is configured to function as a first-order temporal integrator and as a second-order temporal integrator, respectively.

Figure 14:
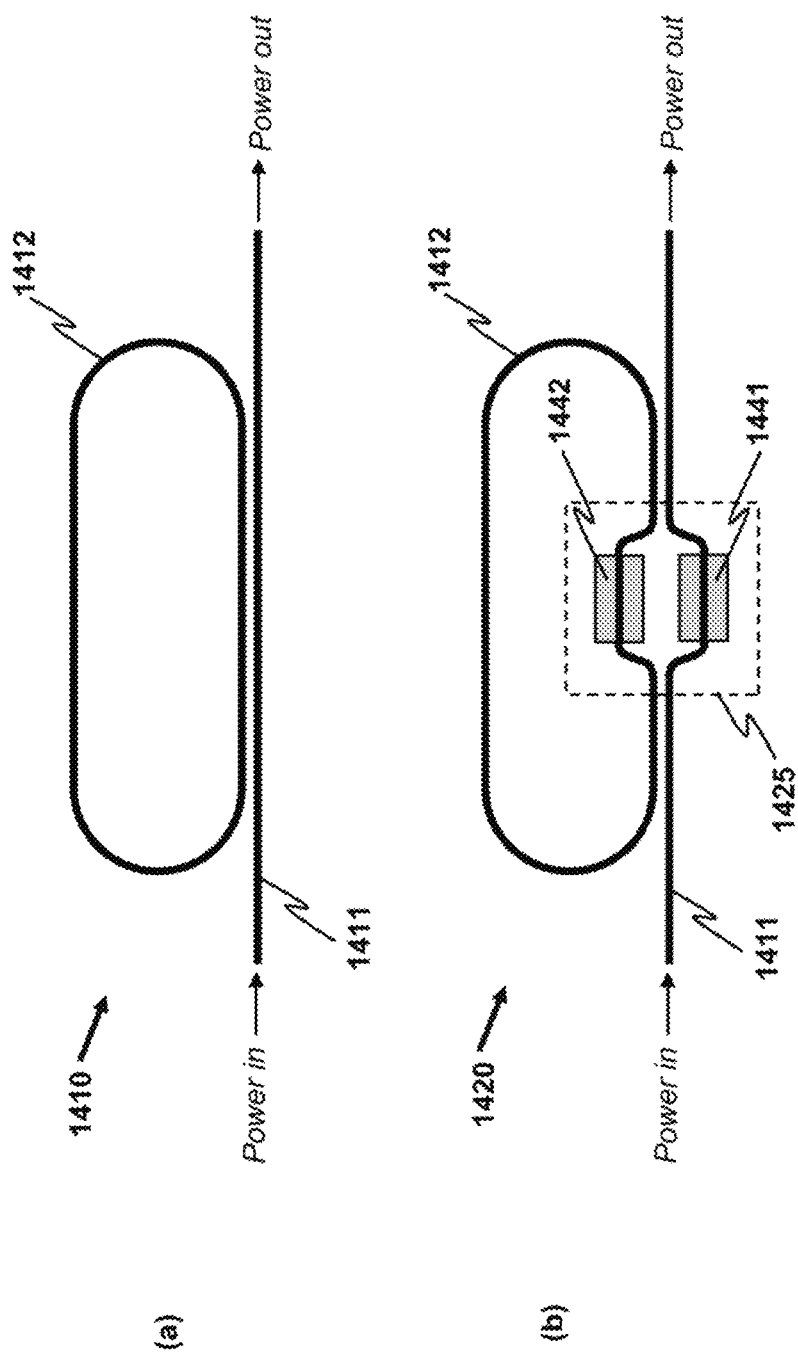
FIG. 14 depicts two realizations of a microring resonator suitable to be employed in the processing unit configured to function as a first-order ODE solver.

In a second embodiment of the first processing unit 821a, the set of n microring resonators 920-1: n consists of a single microring resonator, i.e. n=1, and the single microring resonator 920-1 has a Q factor selected to cause an intensity of the output optical signal 813 over time to be proportional to a solution of a first-order ODE. It thereby configures the first processing unit 821a to function as a first-order ODE solver. In addition, the Q factor may be made tunable and selectable to thereby allow the first-order ODE under different values of k (see EQN. (8)) to be solved by using the same first processing unit 821a. FIG. 14 depicts two realizations of a microring resonator suitable to be employed in the first-order ODE solver. In a first realization 1410, the microring resonator is realized as a conventional assembly of straight waveguide 1411 and ring-shaped waveguide 1412. In this realization, the Q factor is usually fixed. In a second realization 1420, the microring resonator includes a tunable section 1425 in the coupling part between the bus waveguide 1411 and the ring-shaped waveguide 1412 for tuning or adjusting the Q factor, allowing the Q factor to be selectable. As an example for illustration, the tunable section 1425 in FIG. 14 is realized as a TO tunable section. The TO tunable section is installed with a first heater 1441 and a second heater 1442 for controllably heating a section of the straight waveguide 1411 and a section of the ring-shaped waveguide 1412, respectively, so as to tune or select the Q factor of the microring resonator.

Figure 10:
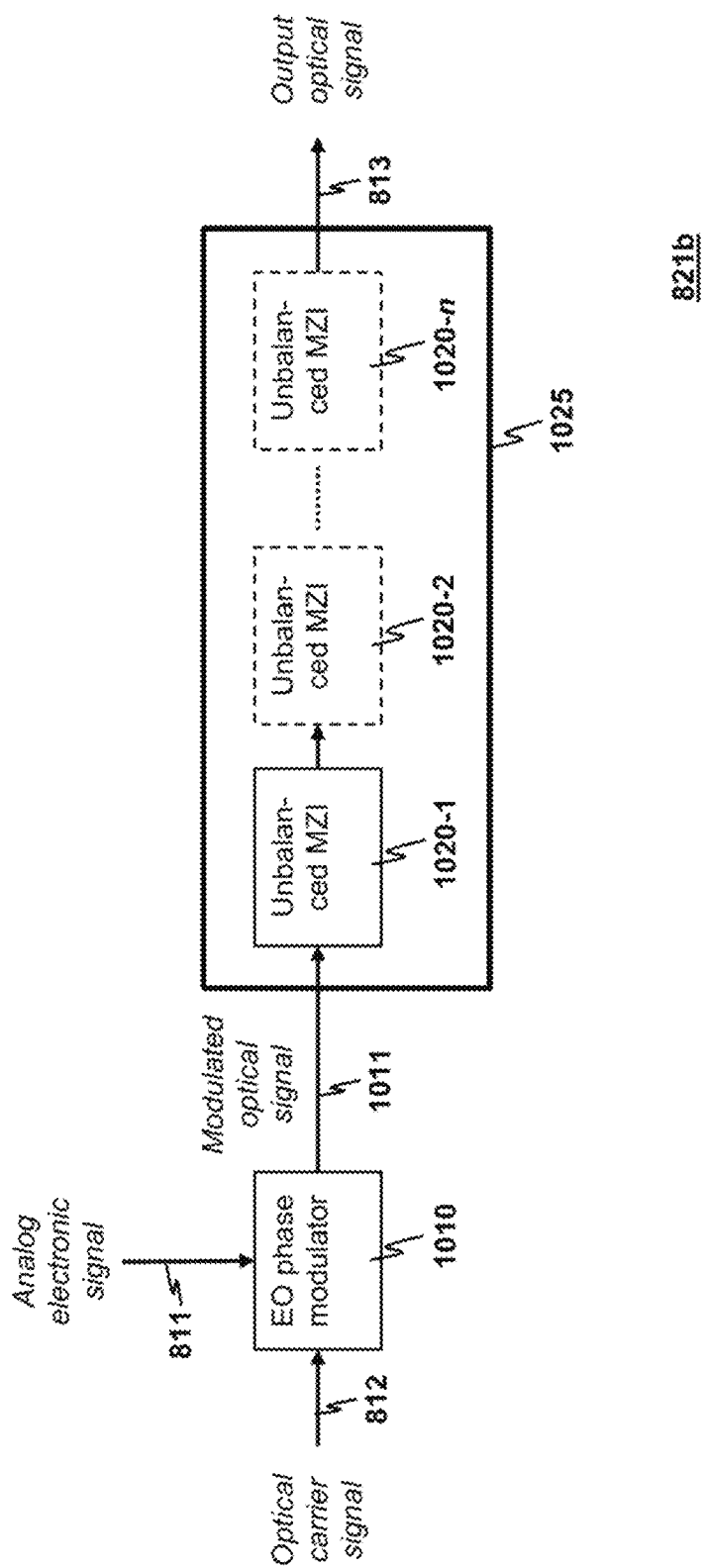
FIG. 10 depicts a second embodiment of the processing unit used in the exemplary MWP system, where the processing unit is used for realizing an nth-order differentiator, $n \geq 1$.

FIG. 10 depicts a second embodiment of the processing unit 821 (referenced as a second processing unit 821b for clarity). The second processing unit 821b is used for realizing an nth-order differentiator, n≥1, as elaborated in Sections A.2 and B.4.

The second processing unit 821b comprises an EO phase modulator 1010 for modulating a phase of the optical carrier signal 812 with the analog electronic signal 811 to yield a modulated optical signal 1011. As a result, the information of the analog electronic signal 811 is embedded in the phase of the modulated optical signal 1011. Additionally, the second processing unit 821b further comprises a set of n unbalanced MZIs 1020-1: n where n is a total number of unbalanced MZI(s) 1020-1: n in the set and is a predetermined positive integer at least 1. In particular, the n unbalanced MZIs 1020-1: n are serially connected to form an optical circuit 1025 used for processing the modulated optical signal 1011 to yield the output optical signal 813. Furthermore, each of the n unbalanced MZIs 1020-1: n in the set is biased at a predetermined point to cause an optical field or intensity of the output optical signal 813 over time to be proportional to a differentiation result obtained by performing an nth-order differentiation of the analog electronic signal 811 over time. In the special cases of n=1 and n=2, the second processing unit 821b is configured to function as a first-order temporal differentiator and as a second-order temporal differentiator, respectively.

The predetermined point for biasing may be a null point or a quadrature point. In case each of the n unbalanced MZIs 1020-1: n in the set is biased at the null point, it causes the optical field of the output optical signal 813 over time to be proportional to the obtained differentiation result. If each of the n unbalanced MZIs 1020-1: n in the set is biased at the quadrature point, it causes the intensity of the output optical signal 813 over time to be proportional to the obtained differentiation result.

Figure 11:
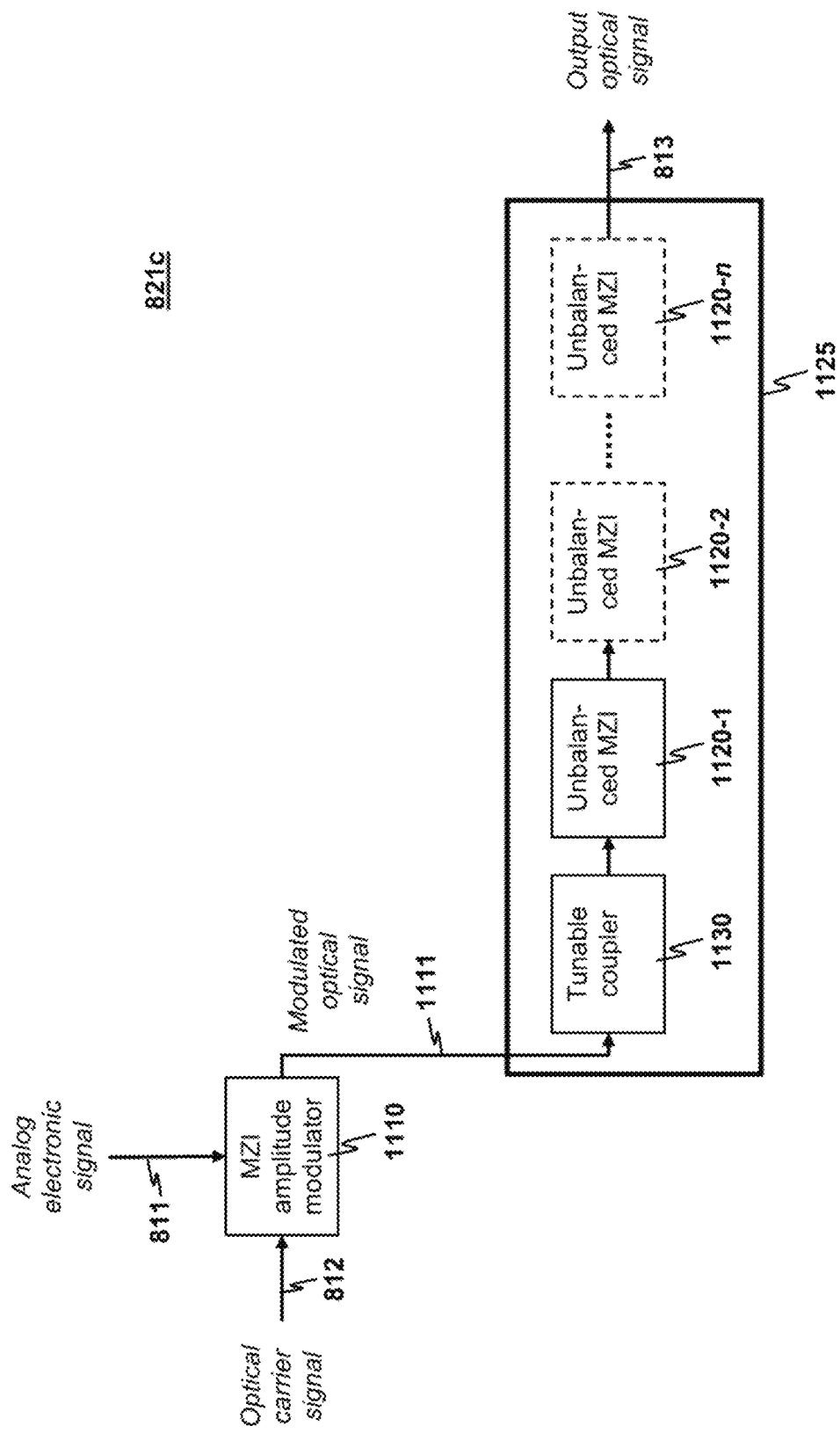
FIG. 11 depicts a third embodiment of the processing unit used in the exemplary MWP system, where the processing unit is used for realizing a fractional-order differentiator.

FIG. 11 depicts a third embodiment of the processing unit 821 (referenced as a third processing unit 821c for clarity). The third processing unit 821c is used for realizing a fractional-order differentiator.

The fractional-order differentiator is similar to the integer-order differentiator realized by the second processing unit 821b. In the third processing unit 821c, an MZI amplitude modulator 1110 is adopted to convert the analog electronic signal 811 to a modulated optical signal 1111 in the optical domain. The key difference of the third processing unit 821c against the second processing unit 821b is that at the first power splitter of the unbalanced MZI-based differentiator 1120-1, instead of a 50:50 power split, a tunable coupler 1130 is used to arbitrarily control the power splitting ratio of the two arms of the unbalanced MZI 1120-1, leading to a tunable spectral response and phase shift at a destructive-interference wavelength. The tunable coupler 1130 with phase shifting can be realized by an EO switch or a TO switch on a same LN chip using either a MZI or a microring resonator architecture integrated with EO control electrodes or TO control electrodes, respectively. By applying different voltages on the control electrodes, the third processing unit 821c exhibits different power splitting ratio at the unbalanced MZI 1120-1, leading to differentiation at different fractional orders.

The third processing unit 821c is detailed as follows. The third processing unit 821c comprises the MZI amplitude modulator 1110 for modulating an optical field of the optical carrier signal 812 with the analog electronic signal 811 to yield the modulated optical signal 1111. The third processing unit 821c further comprises an optical circuit 1125 for processing the modulated optical signal 1111 to yield the output optical signal 813. The optical circuit 1125 is formed by serially cascading the tunable coupler 1130 and a set of n unbalanced MZIs 1120-1: n connected in series, where n≥1. The tunable coupler 1130 is configured to split the modulated optical signal 1111 into a pair of split optical signals with a controllable power-splitting ratio and to feed the pair of split optical signals to the set of n unbalanced MZIs 1120-1: n. An individual unbalanced MZI is biased at a predetermined point. The controllable power-splitting ratio and predetermined point are selected to cause an optical field or intensity of the output optical signal 813 over time to be proportional to a differentiation result obtained by performing a fractional-order differentiation of the analog electronic signal 811 over time.

The predetermined point for biasing may be a null point or a quadrature point. In case each of the n unbalanced MZIs 1120-1: n in the set is biased at the null point, it causes the optical field of the output optical signal 813 over time to be proportional to the obtained differentiation result. If each of the n unbalanced MZIs 1120-1: n in the set is biased at the quadrature point, it causes the intensity of the output optical signal 813 over time to be proportional to the obtained differentiation result.

In certain embodiments, the tunable coupler 1130 is an EO switch or a TO switch. The EO switch may be realized by a first MZI, or a first microring resonator, integrated with EO electrodes. The TO switch may be realized by a second MZI, or a second microring resonator, integrated with EO electrodes.

Figure 12:
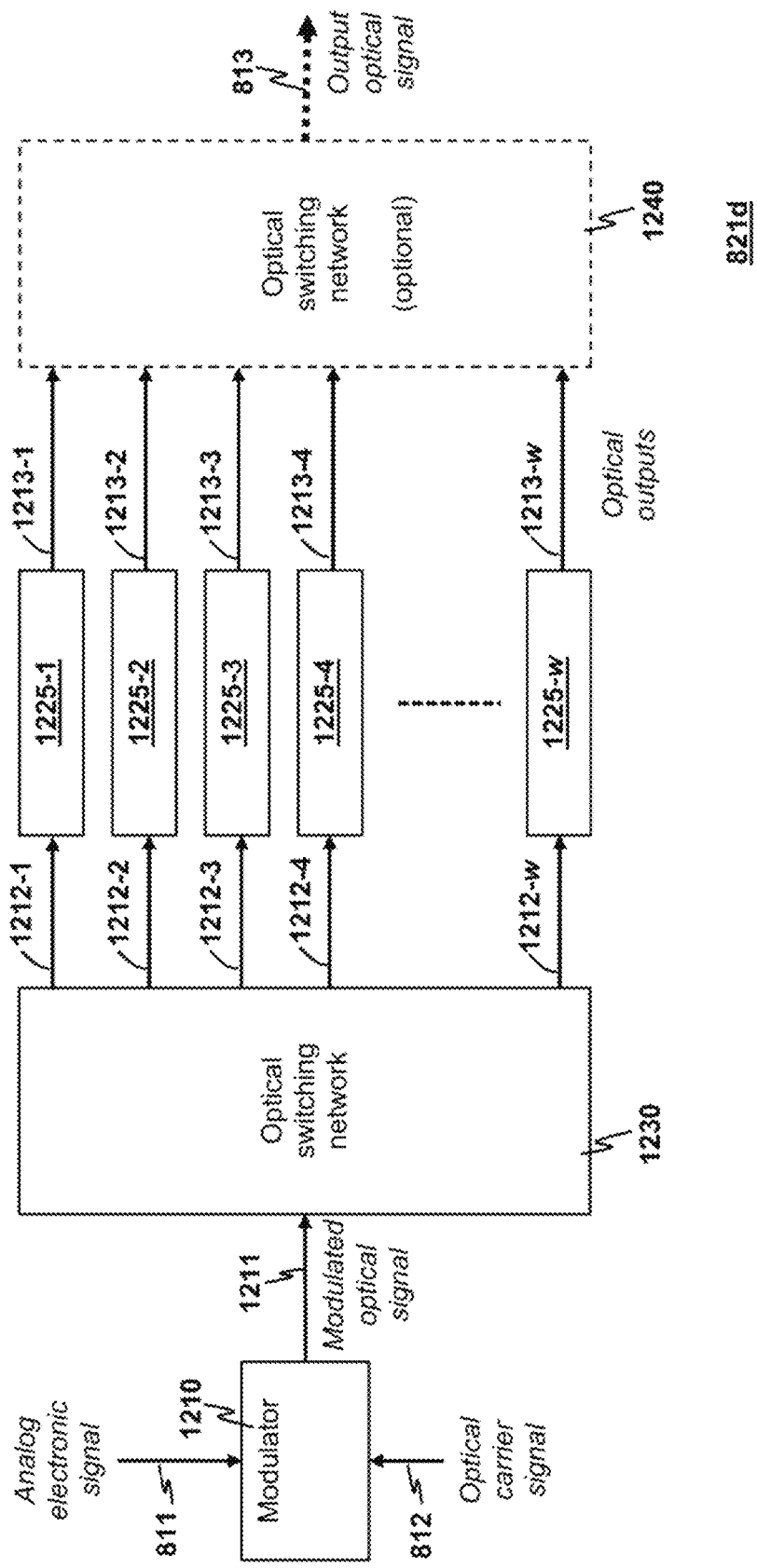
FIG. 12 depicts a fourth embodiment of the processing unit used in the exemplary MWP system, where the processing unit is used for realizing a switchable on-chip microwave photonic signal processor.
Figure 13:
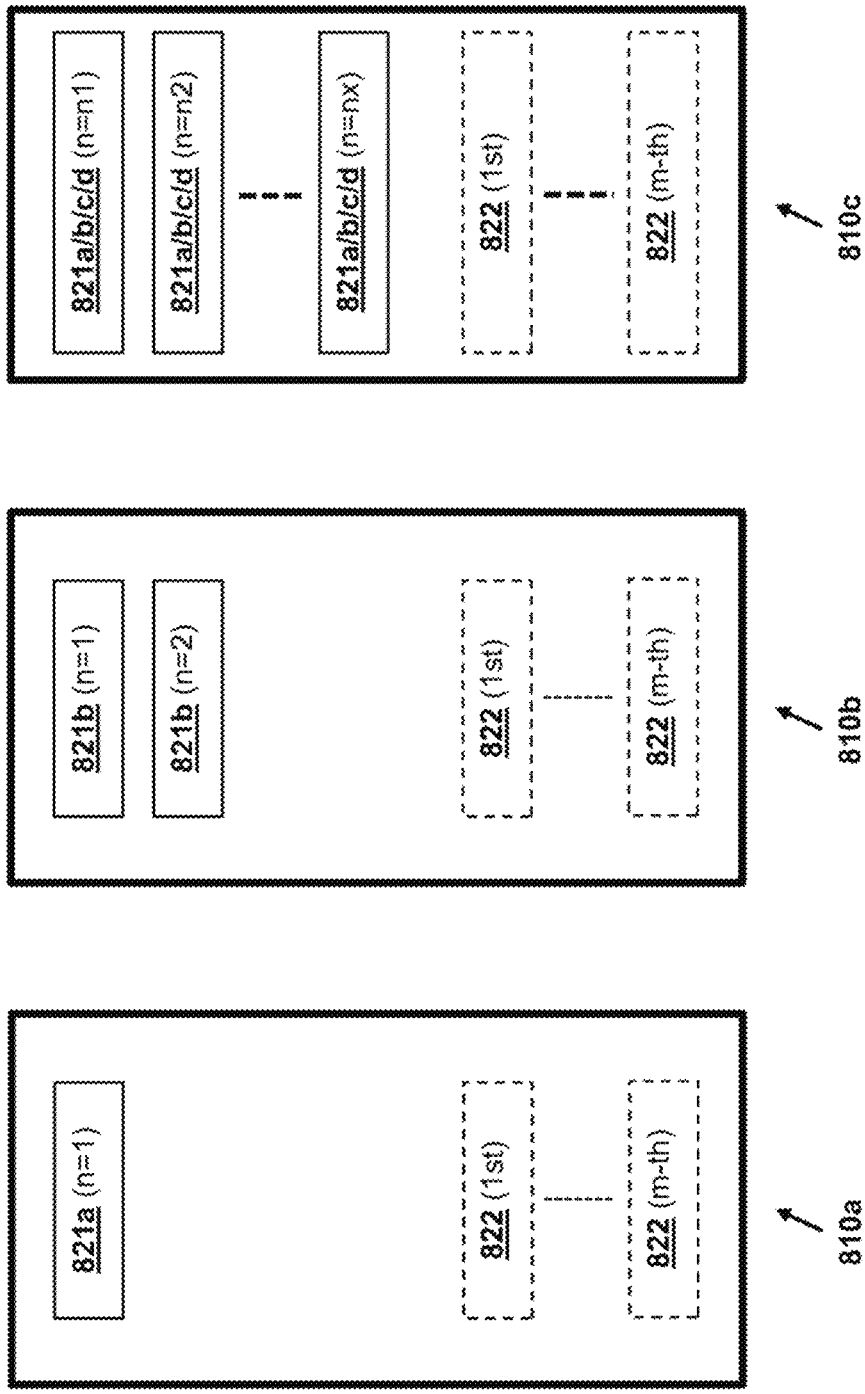
FIG. 13 depicts illustrative examples for demonstrating formation of different realizations of LNPIC.

FIG. 12 depicts a fourth embodiment of the processing unit 821 (referenced as a third processing unit 821d for clarity). The fourth processing unit 821d is used for realizing a switchable on-chip microwave photonic signal processor.

In the fourth processing unit 821d, the analog electronic signal 811 is first used to modulate the optical carrier signal 812 with amplitude modulation or phase modulation to form a modulated optical signal 1211. The modulated optical signal 1211 is then selectively sent to one of optical circuits 1225-1: w for performing a specific optical processing function (e.g., second-order integration). Such selection (switching) function may be realized by an EO switch or a TO switch on a same LN chip. The EO and TO switches are realizable by integrating EO control electrodes and TO control electrodes, respectively, on either a MZI or a microring resonator architecture. Multiple stages of switching may be used to guide the modulated optical signal 1211 into many possible paths for performing different optical processing functions. Finally, w output channels can either be directly outputted from the chip, or be combined into a single output channel using another optical switching network. Note that advantageously all components in the fourth processing unit 821d can be integrated on the same LNPIC chip. It thereby allows the LNPIC to achieve multiple/arbitrary microwave photonic signal processing functions at the same time and at will.

The fourth processing unit 821d is detailed as follows.

At least one output optical signal is generated by the fourth processing unit 821d. The fourth processing unit 821d comprises a modulator 1210, a first optical switching network 1230 and a plurality of optical circuits 1215-1: w, where w>1. The modulator 1210 is used for modulating the optical carrier signal 812 with the analog electronic signal 811 to yield the modulated optical signal 1211. In the plurality of optical circuits 1225-1: w, consider the optical circuit 1225-1 as a representative optical circuit for illustration. The optical circuit 1225-1 is arranged to receive the modulated optical signal 1211 from the first switching network 1230 through a path 1212-1, and is configured to perform an optical processing function on the modulated optical signal 1211 to generate an optical output 1213-1. The first optical switching network 1230 is connected to the plurality of optical circuits 1225-1: w one-by-one through a plurality of paths 1212-1: w. In particular, the first optical switching network 1230 is used for controllably routing the modulated optical signal 1211 to one or more optical circuits (e.g. the optical circuit 1225-1) selected from the plurality of optical circuits 1225-1: w to thereby controllably configure the fourth processing unit 821d to perform one or more respective optical processing functions of the selected one or more optical circuits. As a result, one or more respective optical outputs are generated as the aforesaid at least one output optical signal.

Preferably, the first optical switching network 1230 comprises one or more first optical switches. An individual first optical switch may be an EO switch or a TO switch. The EO switch is realized by a first MZI, or a first microring resonator, integrated with EO control electrodes. The TO switch is realized by a second MZI, or a second microring resonator, integrated with TO control electrodes.

In certain embodiments, the fourth processing unit 821$d$ further comprises a second optical switching network 1240 for controllably selecting one of respective optical outputs 1213-1: w generated by the plurality of optical circuits 1225:1-$w$ to form a single output optical signal, which is the output optical signal 813.

Preferably, the second optical switching network 1240 comprises one or more second optical switches. An individual second optical switch may be an EO switch or a TO switch. Exemplary realizations of the EO and TO switches are mentioned above.

Generally, the modulator 1210 is selected from a group consisting of a MZI amplitude modulator and an EO phase modulator. The MZI amplitude modulator is configured to modulate an optical field of the optical carrier signal 812 with the analog electronic signal 811. The EO phase modulator is configured to modulate a phase of the optical carrier signal 812 with the analog electronic signal 811.

Typically, the individual optical circuit in the plurality of optical circuits 1225-1: w is selected from embodiments of the optical circuits 925, 1025, 1125. The optical circuit 1225-1, as a representative optical circuit, may be selected from a group consisting of first, second, third and fourth optical circuits. The first optical circuit is formed by a first set of one or more microring resonators aligned in resonance peak and connected in series. The second optical circuit is formed by a single microring resonator, where the single microring resonator is formed with a first tunable coupler for tuning a Q factor of the single microring resonator. The third optical circuit is formed by a third set of one or more unbalanced MZIs connected in series. The fourth optical circuit is formed by serially cascading a second tunable coupler and a fourth set of one or more unbalanced MZIs connected in series.

Different embodiments of the LNPIC 810 are realizable by incorporating different numbers of respective first processing units 821$a$ and respective second processing units 821$b$. FIG. 11 depicts three illustrative examples of the LNPIC 810 for demonstrating formation of various embodiments of the LNPIC 810.

In a first example, a first LNPIC 810$a$ is realized with a single copy of the first processing unit 821$a$ with n=1. The first processing unit 821$a$ functions as a first-order temporal integrator or a first-order ODE solver depending on the choice of loaded Q factor used by the microring resonator 920-1. The first LNPIC 810$a$ does not include the second processing unit 821$b$.

In a second example, a second LNPIC 810$b$ is formed with first and second copies of the second processing unit 821$b$, where the first and second copies employ n=1 and n=2, respectively. Hence, the first copy of the second processing unit 821$b$ is operated as a first-order temporal differentiator while the second copy thereof functions as a second-order temporal differentiator. The second LNPIC 810$b$ does not include the first processing unit 821$a$.

In a third example, a third LNPIC 810$c$ is incorporated with a first number of copies of the first processing unit 821$a$, a second number of copies of the second processing unit 821$b$, a third number of copies of the third processing unit 821$c$ and a fourth number of copies of the fourth processing unit 821$d$, where at least two of the four aforementioned numbers are non-zero. The value of n used in an individual processing unit 821$a/b/c/d$ is independently set according to an analog signal processing function desired to be performed by the individual processing unit 821$a/b/c/d$.

Optionally, each of the first, second and third LNPICs 810$a$, 810$b$, 810$c$ may be additionally formed with one or more other processing units 822 not belonging to the first and second processing units 821$a$, 821$b$.

Other implementation details of the system 800 are elaborated as follows.

Generally, the LNPIC 810 works with a plurality of peripheral devices in providing analog signal processing.

Refer to FIG. 8. Since the output optical signal 813 is most often required to be converted back to an electronic signal, generally, a PD 840 is installed in the system 800. The PD 840 is used for receiving the output optical signal 813 from the processing unit 821 and converting the received output optical signal 813 to an output electronic signal 814 to thereby extract the intensity of the output optical signal 813.

The system 800 may use a CW laser source 830 to generate the optical carrier signal 812. Preferably, an EDFA 835 may be used to amplify the optical carrier signal 812 generated by the CW laser source 830 such that the amplified optical carrier signal 812 is fed to the processing unit 821. A FPC 832 connected to the CW laser source 830 and the EDFA 835 may be used to control a polarization of the optical carrier signal 812 generated by the CW laser source 830 and forwarding the optical carrier signal 812 with the controlled polarization to the EDFA 835.

The system 800 may also use an AWG 850 for generating the analog electronic signal 811.

Note that the PD 840, CW laser source 830, EDFA 835, FPC 832 and AWG 850 are peripheral devices to the processing unit 821. In realizing the system 800, some or all of these peripheral devices may be shared by different processing units, provided that, for instance, appropriate (optical) switches are installed in the LNPIC 810. It is also possible that some or all of these peripheral devices are not shareable among different processing units, so that different sets of peripheral devices are used for different processing units.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.
[1] Liu, W. et al. A fully reconfigurable photonic integrated signal processor. Nat. Photon. 10, 190-195 (2016).

[2] Tao, Y. et al. Fully On-Chip Microwave Photonic Instantaneous Frequency Measurement System. Laser & Photonics Reviews, 2200158 (2022).

[3] Dong, J. et al. Compact, flexible and versatile photonic differentiator using silicon Mach-Zehnder interferometers. Opt. Express 21, 7014-7024 (2013).

[4] Liu, W., Zhang, W. & Yao, J. Silicon-based integrated tunable fractional order photonic temporal differentiators. J. Lightwave Technol. 35, 2487-2493 (2017).

[5] Slavík, R. et al. Photonic temporal integrator for all-optical computing. Opt. Express 16, 18202-18214 (2008).

[6] Xu, X. et al. Microcomb-based photonic RF signal processing. IEEE Photonics Technology Letters 31, 1854-1857 (2019).

[7] Minasian, R. A., Chan, E. & Yi, X. Microwave photonic signal processing. Opt. Express 21, 22918-22936 (2013).

[8] Ferrera, M. et al. On-chip CMOS-compatible all-optical integrator. Nat. Commun. 1, 1-5 (2010).

[9] Zhang, W., Wang, Y., Xu, D., Luo, H. & Wen, S. All-optical differentiator in frequency domain. Appl. Phys. Lett. 120, 011102 (2022).

[10] Li, M., Jeong, H.-S., Azaña, J. & Ahn, T.-J. 25-terahertz-bandwidth all-optical temporal differentiator. Opt. Express 20, 28273-28280 (2012).

[11] Morton, P. A. et al. High-power, high-linearity, heterogeneously integrated III-V on Si MZI modulators for RF photonics systems. IEEE Photonics Journal 11, 1-10 (2019).

[12] Tran, M. A. et al. Extending the spectrum of fully integrated photonics to submicrometre wavelengths. Nature 610, 54-60 (2022).

[13] Xiang, C. et al. Laser soliton microcombs heterogeneously integrated on silicon. Science 373, 99-103 (2021).

[14] Boes, A. et al. Lithium niobate photonics: Unlocking the electromagnetic spectrum. Science 379, (2023).

[15] Zhang, M., Wang, C., Kharel, P., Zhu, D. & Lončar, M. Integrated lithium niobate electro-optic modulators: when performance meets scalability. Optica 8, 652-667 (2021).

[16] Zhang, Y. et al. Systematic investigation of millimeter-wave optic modulation performance in thin-film lithium niobate. Photonics Res. 10, 2380-2387 (2022).

[17] Mercante, A. J. et al. Thin film lithium niobate electro-optic modulator with terahertz operating bandwidth. Opt. Express 26, 14810-14816 (2018).

[18] He, M. et al. High-performance hybrid silicon and lithium niobate Mach-Zehnder modulators for 100 Gbit s−1 and beyond. Nat. Photon. 13, 359-364 (2019).

[19] Wang, C. et al. Integrated lithium niobate electro-optic modulators operating at CMOS-compatible voltages. Nature 562, 101-104 (2018).

[20] Ahmed, A. N. R. et al. Subvolt electro-optical modulator on thin-film lithium niobate and silicon nitride hybrid platform. Opt. Lett. 45, 1112-1115 (2020).

[21] Feng, H. et al. Ultra-high-linearity integrated lithium niobate electro-optic modulators. Photonics Res. 10, 2366-2373, (2022).

[22] Zhang, M., Wang, C., Cheng, R., Shams-Ansari, A. & Lončar, M. Monolithic ultra-high-Q lithium niobate microring resonator. Optica 4, 1536-1537 (2017).

[23] Escalé, M. R., Pohl, D., Sergeyev, A. & Grange, R. Extreme electro-optic tuning of Bragg mirrors integrated in lithium niobate nanowaveguides. Optics letters 43, 1515-1518 (2018).

[24] Hu, Y. et al. On-chip electro-optic frequency shifters and beam splitters. Nature 599, 587-593 (2021).

[25] Zhou, J.-x. et al. Electro-optically switchable optical true delay lines of meter-scale lengths fabricated on lithium niobate on insulator using photolithography assisted chemo-mechanical etching. Chinese Physics Letters 37, 084201 (2020).

[26] Luke, K. et al. Wafer-scale low-loss lithium niobate photonic integrated circuits. Opt. Express 28, 24452-24458 (2020).

[27] Li, Z. et al. Tightly confining lithium niobate photonic integrated circuits and lasers. arXiv preprint arXiv:2208.05556 (2022).

[28] Hill, M. T. et al. A fast low-power optical memory based on coupled micro-ring lasers. nature 432, 206-209 (2004).

[29] Tan, S. et al. High-order all-optical differential equation solver based on microring resonators. Opt. Lett. 38, 3735-3738 (2013).

[30] Yang, T. et al. All-optical differential equation solver with constant-coefficient tunable based on a single microring resonator. Scientific reports 4, 1-6 (2014).

[31] Perez, D. et al. Silicon photonics rectangular universal interferometer. Laser & Photonics Reviews 11, 1700219 (2017).

[32] Wen, H. et al. Few-mode fibre-optic microwave photonic links. Light: Science & Applications 6, e17021-e17021 (2017).

[33] Zhang, M. et al. Broadband electro-optic frequency comb generation in a lithium niobate microring resonator. Nature 568, 373-377 (2019).

[34] Kharel, P., Reimer, C., Luke, K., He, L. & Zhang, M. Breaking voltage-bandwidth limits in integrated lithium niobate modulators using micro-structured electrodes. Optica 8, 357-363 (2021).

[35] Milletari, F., Navab, N. & Ahmadi, S.-A. V-net: Fully convolutional neural networks for volumetric medical image segmentation. 2016 fourth international conference on 3D vision (3DV), 565-571 (2016).

[36] Wang, B., de Lima, T. F., Shastri, B. J., Prucnal, P. R. & Huang, C. Multi-Wavelength Photonic Neuromorphic Computing for Intra and Inter-Channel Distortion Compensations in WDM Optical Communication Systems. IEEE J. Sel. Top. Quant. Electron. 29, 1-12 (2022).

[37] Huang, C. et al. A silicon photonic-electronic neural network for fibre nonlinearity compensation. Nat. Electron. 4, 837-844 (2021).

[38] Huang, C. et al. High-capacity space-division multiplexing communications with silicon photonic blind source separation. J. Lightwave Technol. 40, 1617-1632 (2022).

What is claimed is:

1. A microwave photonics (MWP) system for performing analog signal processing, the system comprising:
    a lithium niobate photonic integrated circuit (LNPIC) comprising a processing unit formed in the LNPIC and used for processing an analog electronic signal to yield at least one output optical signal, wherein the processing unit comprises:
        a modulator for modulating an optical carrier signal with the analog electronic signal to yield a modulated optical signal;
        a plurality of optical circuits, an individual optical circuit being arranged to receive the modulated optical signal and configured to perform an optical processing function on the modulated optical signal to generate an optical output; and
        a first optical switching network for controllably routing the modulated optical signal to one or more optical circuits selected from the plurality of optical circuits to thereby controllably configure the processing unit to perform one or more respective optical processing functions of the selected one or more optical circuits, whereby one or more respective optical outputs are generated as the at least one output optical signal.

2. The MWP system of claim 1, wherein:
the plurality of optical circuits includes a first optical circuit;
the at least one output optical signal includes a first output optical signal generated by the first optical circuit; and
a set of one or more microring resonators aligned in resonance peak and connected in series forms the first optical circuit used for processing the modulated optical signal to yield an output optical signal.

3. The MWP system of claim 2, wherein an individual microring resonator has a high Q factor, thereby causing an intensity of the output optical signal over time to be proportional to an integration result obtained by performing an nth-order integration of the analog electronic signal over time, n being a number of microring resonators in the set.

4. The MWP system of claim 3, wherein n is one, thereby configuring the processing unit to function as a first-order temporal integrator in generating the first output optical signal from the analog electronic signal.

5. The MWP system of claim 3, wherein n is two, thereby configuring the processing unit to function as a second-order temporal integrator in generating the first output optical signal from the analog electronic signal.

6. The MWP system of claim 2, wherein the set consists of a single microring resonator, and wherein the single microring resonator is formed with a tunable coupler for tuning a Q factor of the single microring resonator, thereby allowing the Q factor to be selected to cause an intensity of the output optical signal over time to be proportional to a solution of a first-order ordinary differential equation (ODE) such that the processing unit is configured to function as a first-order ODE solver in generating the first output optical signal from the analog electronic signal.

7. The MWP system of claim 6, wherein the tunable coupler is an electro-optic (EO) tunable coupler or a thermo-optic (TO) tunable coupler.

8. The MWP system of claim 1, wherein:
the plurality of optical circuits includes a third optical circuit;
the at least one output optical signal includes a third output optical signal generated by the third optical circuit; and
a set of one or more unbalanced Mach-Zehnder interferometers (MZIs) connected in series forms the third optical circuit, wherein an individual unbalanced MZI is biased at a predetermined point to cause an optical field or intensity of the third output optical signal over time to be proportional to a differentiation result obtained by performing an nth-order differentiation of the analog electronic signal over time, n being a number of unbalanced MZIs in the set.

9. The MWP system of claim 8, wherein the individual unbalanced MZI is biased at a null point so as to cause the optical field of the output optical signal over time to be proportional to the obtained differentiation result.

10. The MWP system of claim 8, wherein the individual unbalanced MZI is biased at a quadrature point so as to cause the intensity of the output optical signal over time to be proportional to the obtained differentiation result.

11. The MWP system of claim 8, wherein n is one, thereby configuring the processing unit to function as a first-order temporal differentiator in generating the third output optical signal from the analog electronic signal.

12. The MWP system of claim 8, wherein n is two, thereby configuring the processing unit to function as a second-order temporal differentiator in generating the third output optical signal from the analog electronic signal.

13. The MWP system of claim 1, wherein:
the plurality of optical circuits includes a fourth optical circuit;
the at least one output optical signal includes a fourth output optical signal generated by the fourth optical circuit; and
the fourth optical circuit is formed by serially cascading a tunable coupler and a set of one or more unbalanced Mach-Zehnder interferometers (MZIs) connected in series, wherein the tunable coupler is configured to split the modulated optical signal into a pair of split optical signals with a controllable power-splitting ratio and to feed the pair of split optical signals to the set of one or more unbalanced MZIs, wherein an individual unbalanced MZI is biased at a predetermined point, and wherein the controllable power-splitting ratio and predetermined point are selected to cause an optical field or intensity of the fourth output optical signal over time to be proportional to a differentiation result obtained by performing a fractional-order differentiation of the analog electronic signal over time.

14. The MWP system of claim 13, wherein the tunable coupler is an electro-optic (EO) switch or a thermo-optic (TO) switch, wherein the EO switch is realized by a first MZI, or a first microring resonator, integrated with EO control electrodes, and wherein the TO switch is realized by a second MZI, or a second microring resonator, integrated with TO control electrodes.

15. The MWP system of claim 1, wherein the first optical switching network comprises one or more optical switches, wherein an individual optical switch is an electro-optic (EO) switch or a thermo-optic (TO) switch, wherein the EO switch is realized by a first MZI, or a first microring resonator, integrated with EO control electrodes, and wherein the TO switch is realized by a second MZI, or a second microring resonator, integrated with TO control electrodes.

16. The MWP system of claim 1, wherein the processing unit further comprises:
a second optical switching network for controllably selecting one of respective optical outputs generated by the plurality of optical circuits to form a single output optical signal.

17. The MWP system of claim 16, wherein the second optical switching network comprises one or more optical switches, wherein an individual optical switch is an electro-optic (EO) switch or a thermo-optic (TO) switch, wherein the EO switch is realized by a first MZI, or a first microring resonator, integrated with EO control electrodes, and wherein the TO switch is realized by a second MZI, or a second microring resonator, integrated with TO control electrodes.

18. The MWP system of claim 1, wherein the modulator is selected from a group consisting of:
a Mach-Zehnder interferometer (MZI) amplitude modulator configured to modulate an optical field of the optical carrier signal with the analog electronic signal; and an electro-optic (EO) phase modulator configured to modulate a phase of the optical carrier signal with the analog electronic signal.

19. The MWP system of claim 1, wherein the individual optical circuit is selected from a group consisting of:
- a first optical circuit formed by a first set of one or more microring resonators aligned in resonance peak and connected in series;
- a second optical circuit formed by a single microring resonator, wherein the single microring resonator is formed with a first tunable coupler for tuning a Q factor of the single microring resonator;
- a third optical circuit formed by a third set of one or more unbalanced Mach-Zehnder interferometers (MZIs) connected in series; and
- a fourth optical circuit formed by serially cascading a second tunable coupler and a fourth set of one or more unbalanced MZIs connected in series.

* * * * *